(12) United States Patent
Masuo

(10) Patent No.: US 11,500,584 B2
(45) Date of Patent: Nov. 15, 2022

(54) MEMORY SYSTEM AND CONTROL METHOD

(71) Applicant: Kioxia Corporation, Tokyo (JP)

(72) Inventor: Yoko Masuo, Iruma (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/014,832

(22) Filed: Sep. 8, 2020

(65) Prior Publication Data

US 2021/0240392 A1 Aug. 5, 2021

(30) Foreign Application Priority Data

Jan. 31, 2020 (JP) ............................. JP2020-014901

(51) Int. Cl.
*G06F 3/06* (2006.01)
*G06F 12/02* (2006.01)

(52) U.S. Cl.
CPC .......... *G06F 3/0659* (2013.01); *G06F 3/0616* (2013.01); *G06F 3/0679* (2013.01); *G06F 12/0253* (2013.01); *G06F 2212/1044* (2013.01)

(58) Field of Classification Search
CPC .... G06F 3/0616; G06F 3/0689; G06F 3/0644; G06F 3/0659; G06F 3/0679; G06F 2212/1044; G06F 12/0253
See application file for complete search history.

(56) References Cited

U.S. PATENT DOCUMENTS

| | | | |
|---|---|---|---|
| 6,728,905 B1* | 4/2004 | Gnanasivam | G06F 3/0617 714/43 |
| 10,324,833 B2 | 6/2019 | Mitsumasu | |
| 10,346,039 B2 | 7/2019 | Kojima | |
| 2015/0261462 A1* | 9/2015 | Miwa | G06F 3/0629 711/114 |
| 2016/0034206 A1* | 2/2016 | Ryan | G06F 12/0246 711/103 |
| 2020/0264807 A1* | 8/2020 | Sato | G06F 3/0634 |

OTHER PUBLICATIONS

Chang, Li-Pin, Tei-Wei Kuo, and Shi-Wu Lo. "Real-time garbage collection for flash-memory storage systems of real-time embedded systems." ACM Transactions on Embedded Computing Systems (TECS) 3.4 (2004): 837-863. (Year: 2004).*

* cited by examiner

*Primary Examiner* — Kalpit Parikh
(74) *Attorney, Agent, or Firm* — Oblon, McClelland, Maier & Neustadt, L.L.P.

(57) ABSTRACT

According to one embodiment, a memory system includes a nonvolatile memory and a controller. The nonvolatile memory includes blocks. The controller controls the nonvolatile memory. The controller acquires a write amount to the nonvolatile memory in a first period. The controller calculates an estimated amount of writing to the nonvolatile memory in the first period. The controller changes, when the write amount is larger than the estimated amount by a first threshold value or more, one or more parameters used for writing of data to the nonvolatile memory.

20 Claims, 8 Drawing Sheets

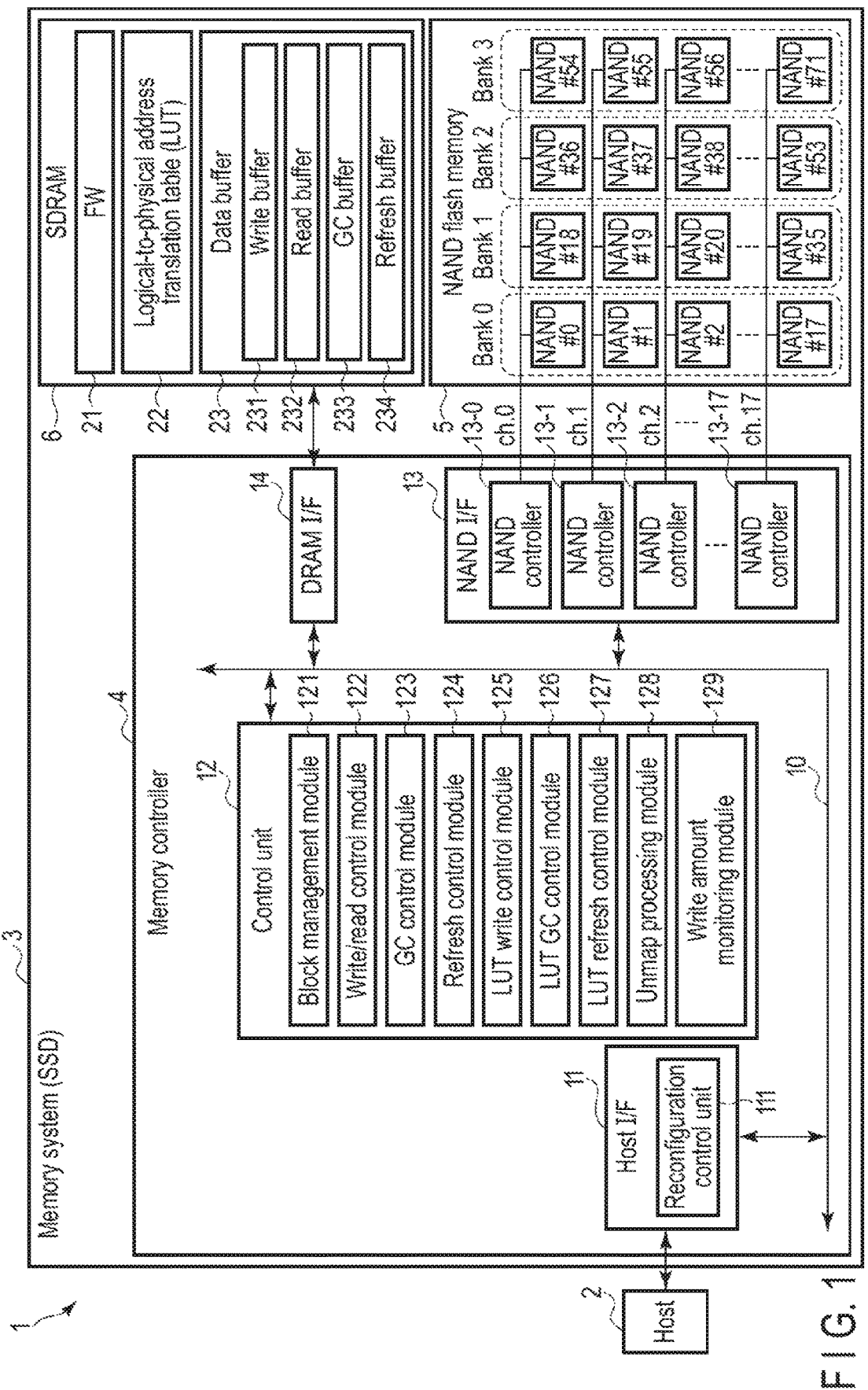
F I G. 1

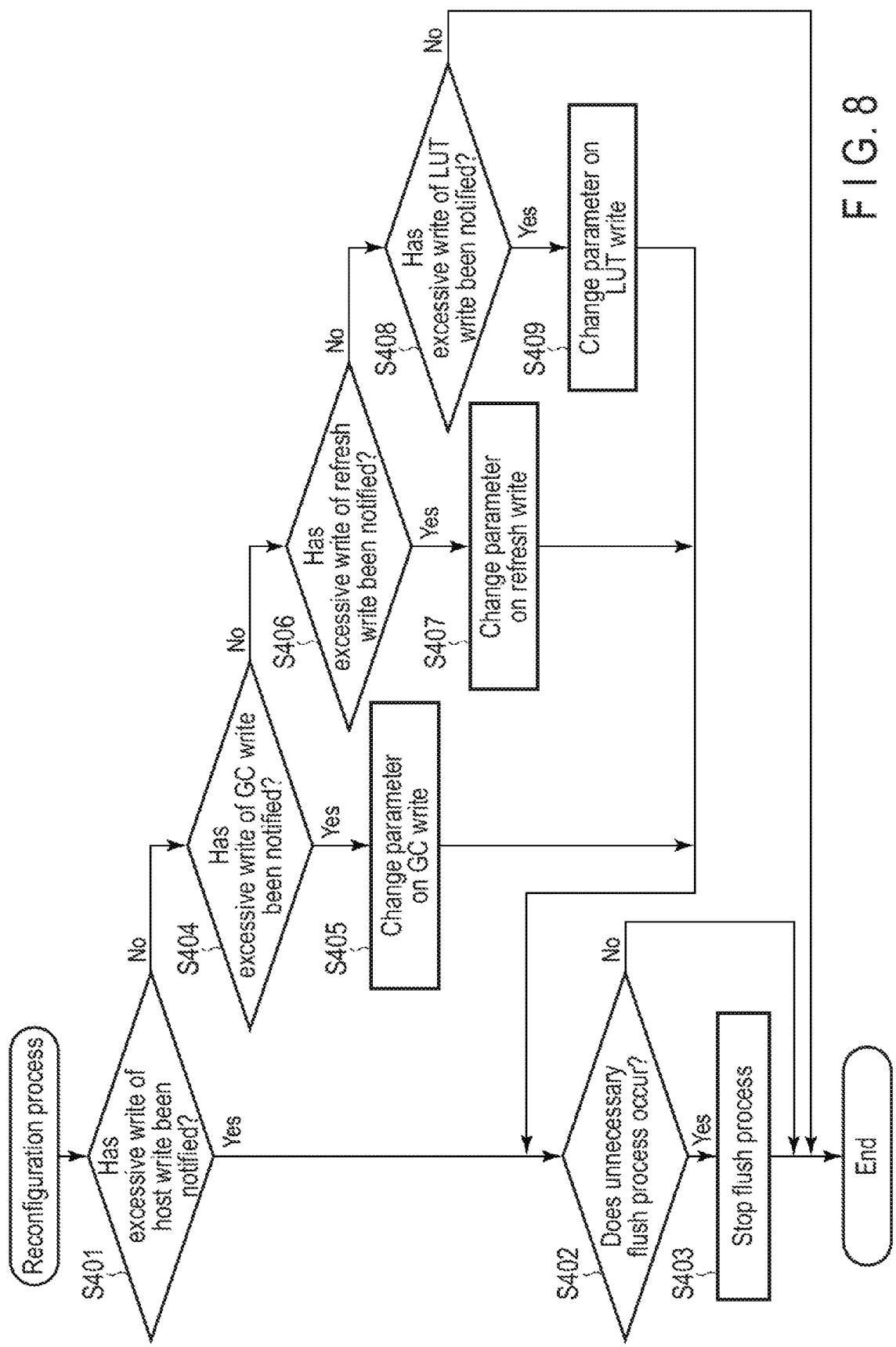
F I G. 8

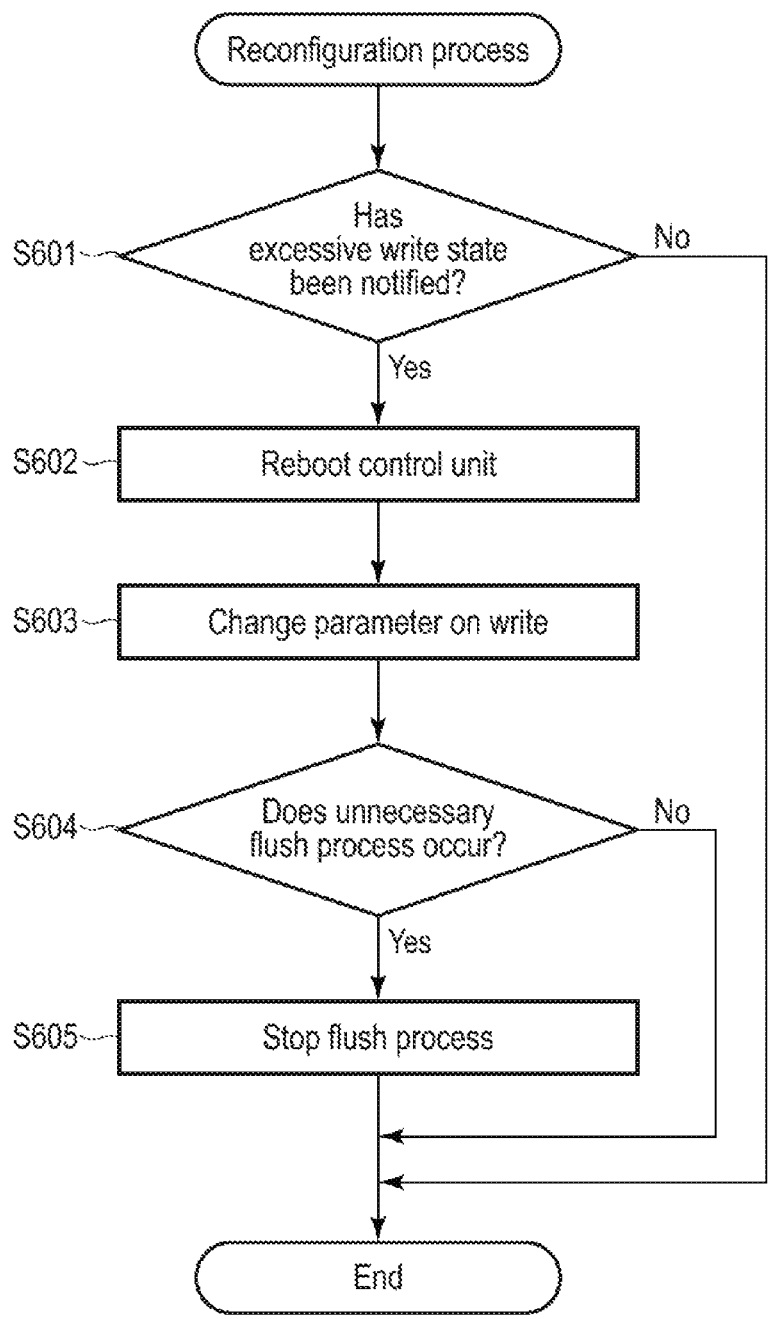
F I G. 9

MEMORY SYSTEM AND CONTROL METHOD

CROSS-REFERENCE TO RELATED APPLICATIONS

This application is based upon and claims the benefit of priority from Japanese Patent Application No. 2020-014901, filed Jan. 32, 2020, the entire contents of which are incorporated herein by reference.

FIELD

Embodiments described herein relate generally to a memory system including a nonvolatile memory and a control method of the memory system.

BACKGROUND

In recent years, memory systems including nonvolatile memories are widely prevailing.

As one of the memory systems, a solid state drive (SSD) including a NAND flash memory is known. The SSD is used as a main storage of various computing devices.

The NAND flash memory wears as data is written into the NAND flash memory. For this reason, the amount of data written to the NAND flash memory greatly influences its lifetime. As an index quantitatively indicative of a write endurance of an SSD, Drive Writes Per Day (DWPD) is used. DWPD is indicative of how many times a day the whole capacity thereof can be rewritten in the operation guarantee period of the SSD. That is, performing write operations of the data amount, which is obtained by multiplying the whole capacity of the SSD by DWPD, every day in the operation guarantee period is guaranteed.

In an SSD, not only a process of writing data into the NAND flash memory in accordance with a request of a host (i.e., a host write operation), but also various processes including a write process on the background are executed. The background processes include wear leveling of leveling the wear of the NAND flash memory to extend the lifetime, garbage collection (GC), refresh for data maintenance, system data management, and the like.

However, when excessive write operations due to the background processes occur, the wear of the NASD flash memory may accelerate and the SSD may be broken earlier than the operation guarantee period.

BRIEF DESCRIPTION OF THE DRAWINGS

FIG. 1 is a block diagram illustrating a configuration of a memory system according to an embodiment.

FIG. 8 is a flowchart illustrating an example of a procedure of a reconfiguration process executed in the memory system of the embodiment.

FIG. 9 is a flowchart illustrating another example of a procedure of the reconfiguration process executed in the memory system of the embodiment.

DETAILED DESCRIPTION

Figure 2:
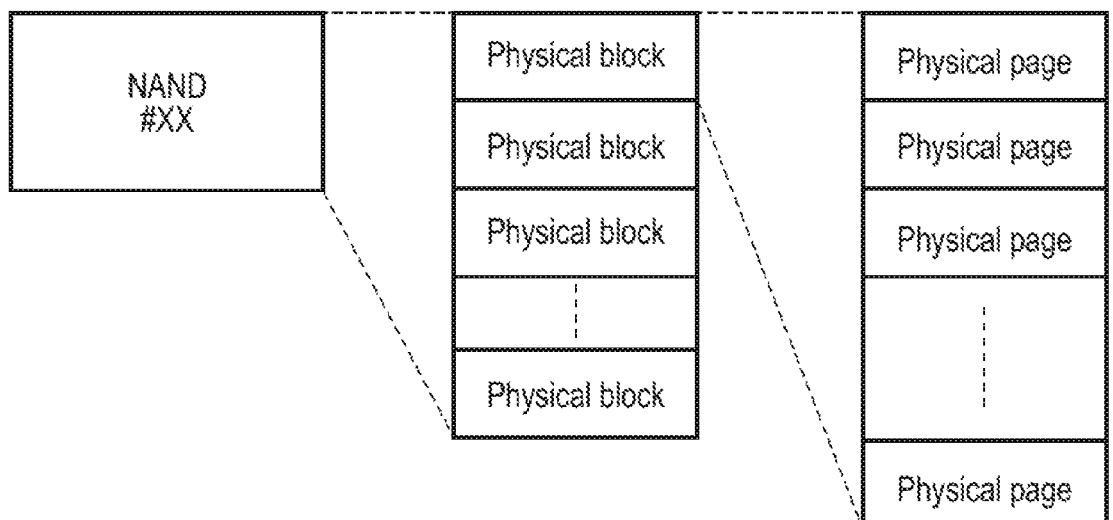
FIG. 2 is a diagram illustrating a configuration example of a NAND flash memory die in the memory system of the embodiment.

Various embodiments will be described hereinafter with reference to the accompanying drawings.

In general, according to one embodiment, a memory system includes a nonvolatile memory and a controller. The nonvolatile memory includes blocks. The controller controls the nonvolatile memory. The controller acquires a write amount to the nonvolatile memory in a first period. The controller calculates an estimated amount of writing to the nonvolatile memory in the first period. The controller changes, when the write amount is larger than the estimated amount by a first threshold value or more, one or more parameters used for writing of data to the nonvolatile memory.

FIG. 1 is a block diagram illustrating a configuration example of an information processing system 1 including a memory system according to an embodiment. The information processing system 1 includes a host device 2 (hereinafter referred to as a host 2) and a solid state drive (SSD) 3 serving as an example of a memory system 3.

The memory system 3 is configured to write data to a nonvolatile memory such as a NAND flash memory 5 (hereinafter referred to as a NAND memory 5) and to read data from the nonvolatile memory. The memory system 3 is referred to as a semiconductor storage device or a storage device. An example in which the memory system 3 is implemented as, for example, an SSD 3 that includes the NAND memory 5 will be described below. The memory system 3 may be implemented net as the SSD 3, but a storage device such as UFS (Universal Flash Storage) or a memory card.

The host 2 may be a storage server that stores a large amount of various data in the SSD 3, or may be a personal computer.

The SSD 3 may be used as a storage of the host 2. The SSD 3 may be built in the host 2 or connected to the host 2 via a cable or a network.

An interface for connection between the host 2 and the SSD 3 conforms to SCSI, Serial Attached SCSI (SAS), AT Attachment (ATA), Serial ATA (SATA), PCI Express (PCIe) (registered trademark), Ethernet (registered trademark), Fibre channel, NVM Express (NVMe) (registered trademark), and the like.

The SSD 3 includes a memory controller 4 and the NAND memory 5. The memory controller 4 may be implemented by a semiconductor integrated circuit such as System-on-a-chip (SoC).

The SSD 3 may include, for example, a synchronous dynamic random access memory (SDRAM) 6 as a random access memory (RAM) which is a nonvolatile memory. Alternatively, a RAM such as a static random access memory (SRAM) may be built in the memory controller 4. Incidentally, the SDRAM 6 may be built in the memory controller 4.

In the RAM such as the SDRAM 6, for example, a storage area of a firmware (FW) 21 loaded from the NAND memory 5, a cache region of a logical-to-physical address translation table 22, and a buffer region where data to be written into the NAND memory 5 and data read from the NAND memory 5 are temporarily stored, are provided. This buffer region is hereinafter referred to as a data buffer 23.

The data buffer 23 includes a write buffer 231, a read buffer 232, a garbage collection (GC) buffer 233, and a refresh buffer 234. The write buffer 231 temporarily stores user data that is required to be written into the NAND memory 5 by the host 2. The user data is, for example, data which is received from the host 2 in accordance with a write command and which is to be written into the NAND memory 5. The read buffer 232 temporarily stores user data that is read from the NAND memory 5 in accordance with a request of the host 2. The GC buffer 233 temporarily stores data that is read from the NAND memory 5 for GC. The refresh buffer 234 temporarily stores data that is read from, the NAND memory 5 for refresh.

The NAND memory 5 includes multiple physical blocks. Each of the physical blocks includes multiple pages. The blocks each function as a minimum erase unit. The physical block is often referred to as an erase block. Each of the pages includes multiple memory cells connected to a single word line. The pages each function as a unit of a data write operation and a data read operation. Note that a word line may be used as a unit of a data write operation and a data read operation.

The tolerable maximum number of program/erase cycles (maximum number of P/E cycles) for each of the physical blocks is limited. One P/E cycle of a physical block includes an erase operation to erase data stored in all memory cells in the physical block and a write operation to write data in each page of the physical block.

The memory controller 4 includes a host, interface (host I/F) 11, a control unit 12, a NAND interface (NAND I/F) 13, and a DRAM interface (DRAM I/F) 14. The host I/F 11, the control unit 12, the NAND I/F 13, and the DRAM I/F 14 may be mutually connected through a bus 10.

The memory controller 4 is electrically connected to the NAND memory 5 via the NAND I/F 13. The NAND I/F 13 functions as a NAND control circuit configured to control the NAND memory 5. The NAND I/F 13 conforms to an interface standard such as a Toggle DDR or an open NAND flash interface (ONFI).

The NAND I/F 13 may include multiple NAND controllers 13-0 to 13-17. The NAND controllers 13-0 to 13-17 may establish communication with multiple NAND flash memory dies (hereinafter referred to as NAND memory dies) #0 to #71 in the NAND memory 5, via multiple channels (for example, 18 channels Ch.0 to Ch.17), respectively. By operating the NAND memory dies #0 to #71 in parallel, it is possible to broaden an access bandwidth to the NAND memory 5. The NAND memory dies are also referred to as NAND flash memory chips or nonvolatile memory chips.

The memory controller 4 functions as a memory controller configured to control the NAND memory 5.

The memory controller 4 may function as a flash translation layer (FTL) configured to execute data management and block management of the NAND memory 5. The data management executed by the FTL includes (1) management of mapping data indicative of relationship between each logical address and each physical address of the NAND memory 5, (2) process to hide read/write operations in units of page and an erase operation in units of block, and the like. The logical address is an address used by the host 2 for addressing memory space of the SSD 3.

A management, of mapping between each logical address and each physical address may be executed by using the logical-to-physical address translation table 22. The memory controller 4 manages mapping between each logical address and each physical address with a certain management size unit by using the logical-to-physical address translation table 22. A physical address corresponding to a logical address indicates a physical memory location in the NAND memory 5 to which data of the logical address is written. The logical-to-physical address translation table 22 may be loaded to the SDRAM 6 from the NAND memory 5 when the SSD 3 is powered on. The logical-to-physical address translation table 22 is implemented as, for example, a look-up table (LUT). The logical-to-physical address translation table 22 is hereinafter referred to as LUT 22.

Data write into one page is executable only once in a single P/E cycle. Thus, the memory controller 4 writes update data corresponding to a logical address not to an original physical memory location in which previous data corresponding to the logical address is stored but to a different physical memory location. Then, the memory controller 4 updates the LUT 22 to associate the logical address with the different physical memory location and to invalidate the previous data.

The block management includes, for example, management of defective blocks, wear leveling, GC, and refresh.

The host I/F 11 is a hardware interface which establishes communication between the SSD 3 and the host 2 serving as an external device of the SSD 3. The host I/F 11 functions as a circuit which receives various commands, for example, I/O commands and various control commands, from the host 2. The I/O commands may include a write command and a read command. The control commands may include an unmap command (trim command) and a format command. The format command is a command for initializing a state of the storage area of the NAND memory 5. The host I/F 11 also functions as a transmission circuit that transmits a response and data in accordance with a command, to the host 2.

The DRAM I/F 14 functions as a DRAM control circuit configured to control access to the SDRAM 6. A storage area of the SDRAM 6 is allocated to an area for storing the FW 21 and a buffer area used as the write buffer 231, the read buffer 232, and the like.

The control unit 12 is a processor configured to control the host I/F 11, the NAND I/F 13, and the DRAM I/F 14. The control unit 12 executes various processes by executing the FW 21 loaded to the SDRAM 6. That is, the FW 21 is control programs for controlling operations of the control unit 12. The control unit 12 may perform, in addition to the above-described processes of FTL, command processes to process various commands from the host 2. Note that part of or the entire FTL processes and the command processes may be executed by a dedicated hardware in the memory controller 4.

The control unit 12 may function as, for example, a block management module 121, a write/read control module 122, a GC control module 123, a refresh control module 124, an LUT write control module 125, an LUT GC control, module 126, an LUT refresh control module 127, an unmap processing module 128, and a write amount monitoring module 129. The control unit 12 functions as each of the modules by, for example, executing the FW 21. Processes of these modules may be executed in parallel by multiple processors, or the processes may be executed in time division by a single processor. Furthermore, The processes may be executed in parallel by the processors and in time division by each of the processors.

The block management module 121 may construct a block group, which is an extensible management unit, with several physical blocks among the physical blocks included in the NAND memory 5. In addition, the block management module 121 performs management of information on a physical block and a block group (hereinafter referred to as block information), and supply of a physical block or a block group to each module that controls writing to the NAND memory 5, such as the write/read control module 122 and the GC control module 123.

A block group managed by the block management module 121 will be described with reference to FIG. 2 and FIG. 3 in addition to FIG. 1.

As illustrated in FIG. 1, the NAND memory 5 includes the multiple NAND memory dies #0 to #71 each including a memory cell array and a peripheral circuit. The memory cell array includes multiple physical blocks and is capable of persistently storing data. The peripheral circuit controls the memory cell array. Each of the NAND memory dies is operable independently. That is, each of the NAND memory dies functions as a parallel operation unit. The same number of NAND memory dies may be connected to each of the channels (for example, 18 channels Ch.0 to Ch.17). For example, four NAND memory dies may be connected to each channel. The channels Ch.0 to Ch.17 may include communication lines (i.e., memory buses) in which the NAND controllers 13-0 to 13-17 in the NAND I/F 13 communicate with the NAND memory dies #0 to #71.

For example, multiple banks may be connected in parallel to the 18 channels Ch.0 to Ch.17. In the example of four banks 0 to 3, for example, each bank is composed of 18 NAND memory dies. That is, the NAND memory dies #0 to #17 constitute the Bank0, the NAND memory dies #18 to #35 constitute the Bank1, the NAND memory dies #36 to #53 constitute the Bank2, and the NAND memory dies #54 to #71 constitute the Bank3. The banks each function as a unit which urges multiple NAND memory dies to operate in parallel according to bank interleaving. In the configuration example illustrated in FIG. 1, up to 72 NAND flash memory dies #0 to #72 can be urged to operate in parallel according to bank interleaving using the four Banks 0 to 3 via the 18 channels Ch.0 to Ch.17.

FIG. 2 is a diagram illustrating a configuration example of the NAND memory die.

As illustrated in FIG. 2, the NAND memory die includes multiple physical blocks each including multiple physical pages. Hereinafter, a page indicates a physical page. Writing and reading of data is executed in units of a page. In contrast, erasing of data is executed in units of a physical block. Data is not written to a page in which data is already written.

For this reason, when updating data on a page corresponding to a logical address, the memory controller 4 writes new data to the other page. Then, the memory controller 4 updates the LUT 22 to associate the logical address with the other page and to invalidate the data on the original page. Note that data which is associated with a logical address and which may be read later by the host 2 is referred to as valid data. In addition, data which is not associated with any logical address and which may no longer be read by the host 2 is referred to as invalid data.

Figure 3:
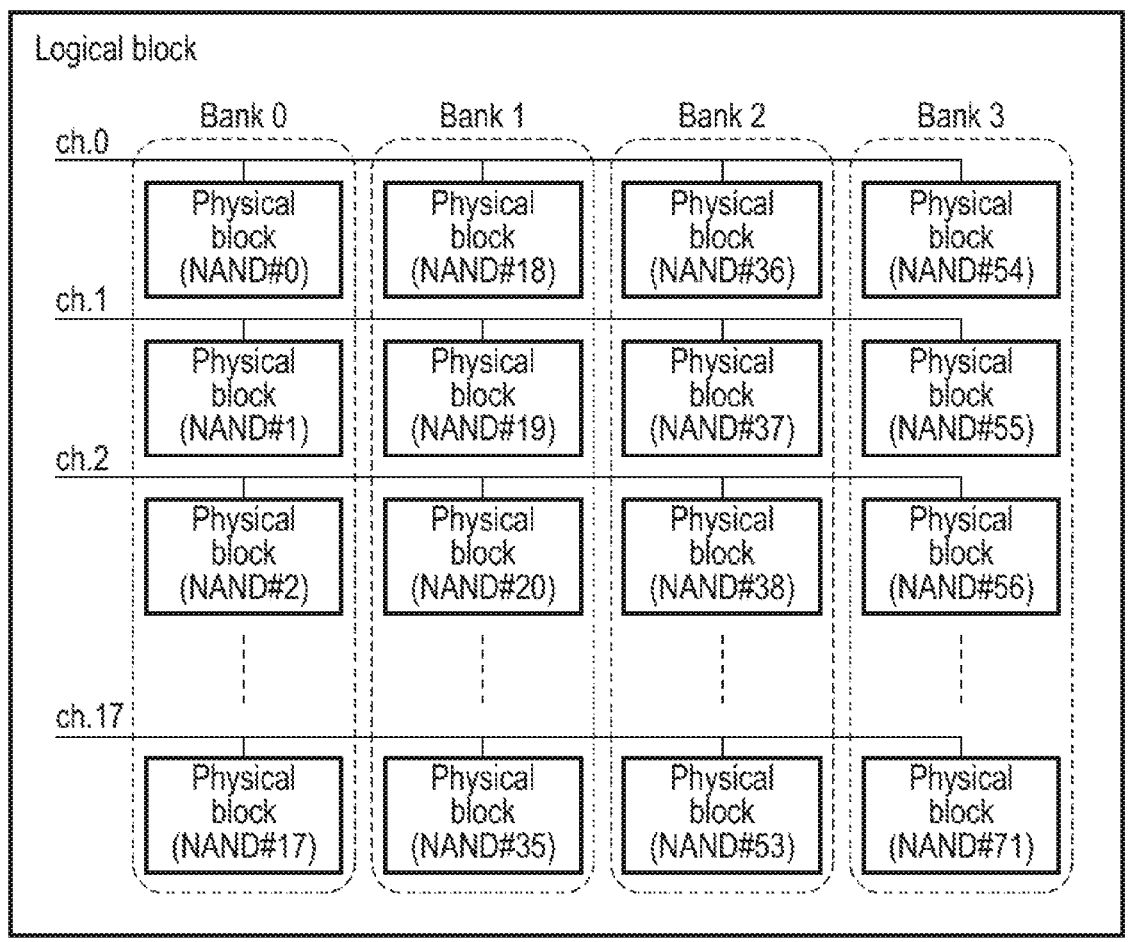
FIG. 3 is a diagram illustrating a configuration example of a logical block managed on a NAND flash memory in the memory system of the embodiment.

FIG. 3 is a diagram illustrating a configuration example of a block group managed by the block management module 121.

The block management module 121 manages multiple block groups each including multiple physical blocks. In the SSD 3, erasing of data may be executed in units of a block group.

For example, the block management module 121 selects one physical block from each of the NAND memory dies #0 to #71 and manages a block group including the selected 72 physical blocks. The NAND I/F 13 may urge the NAND memory dies #0 to #71 to operate in parallel according to bank interleaving using the four Banks 0 to 3 via the 18 channels Ch.0 to Ch.17. For this reason, the NAND I/F 13 may execute, for example, writing of data to 72 pages for one block group.

Incidentally, the block management module 121 may select one physical block from each of the NAND memory dies the number of which is smaller than 72 (for example, 36 or 18 NAND memory dies) and manage the selected physical blocks as one block group. A combination of NAND memory dies from which physical blocks constituting one block group are selected, respectively are desirably different from each ether with respect to channel and bank. When each of the NAND memory dies has, for example, a double plane structure as the multi-plane structure, the block management module 121 selects, for example, one physical block from each of 144 planes corresponding to the NAND memory dies #0 to #71 and manages a block group including the 144 physical blocks.

The block management module 121 supplies a physical block or a block group in the NAND memory 5, as a write destination block, to each of the modules in the control unit 12 that performs writing to the NAND memory (for example, the write/read control module 122, the GC control module 123, the refresh control module 124, the LUT write control module 125, the LUT GC control module 126, the LUT refresh control module 127, and the unmap processing module 128). Each of the modules writes data to the block supplied by the block management module 121 to execute writing of the data to the NAND memory 5. The block management module 121 manages block information indicates: physical blocks constituting each block group; whether each physical block is used or not; the total number of physical blocks; the number of free blocks; the valid cluster ratio of each physical block; whether each physical block is used for storing user data or system management data; and the like. A free block does not store valid data and becomes available for writing new data by performing an erase process. In addition, the system management data is, for example, the LUT 22. The valid cluster ratio will be described later.

The block management module 121 may perform the erase process on a physical block that is a free block and may thereby supply the physical block again as a write destination block. An example where the block management module 121 supplies a physical block as a write destination block will be described below to make the descriptions easily understood.

The descriptions return to FIG. 1 and continue explanations of each processing module in the control unit 12.

The write/read control module 122 executes writing of data to the NAND memory 5 and reading of data from the NAND memory 5 in accordance with requests of the host 2. More specifically, when receiving a write command from the host 2 via the host I/F 11, the write/read control module 122 receives user data that is to be written into the NAND memory 5, via the host I/F 11, and stores the received user data in the write buffer 231. Then, the write/read control module 122 writes the user data stored in the write buffer 231 into the NAND memory 5 via the NAND I/F 13. The physical block where the user data is written is a physical block supplied as a host write destination block by the block management module 121. In the following descriptions, writing user data into the NAND memory 5 in accordance with a write request of the host 2 (for example, a write command received from the host 2) is also referred to as host write (or a host write operation).

In addition, when receiving a read command from the host 2 via the host I/F 11, the write/read control module 122 specifies the physical address corresponding to the logical address specified in the read command, with the LUT 22. Then, the write/read control module 122 reads data from the specified physical address via the NAND I/F 13. The data that has been read is stored in the read buffer 232. The write/read control module 122 sends the data stored in the read buffer 232 to the host 2 via the host I/F 11.

The GC control module 123 executes a first GC process. The first GC process is a GC process for a block storing user data (i.e., a GC source block).

The GC process is a process for reusing an area where invalid data remains, for the purpose of acquiring a free block. The physical block becomes a state in which invalid data is stored by updating and deleting the written data. The ratio of areas storing valid data to areas that are capable of storing data (i.e., valid areas) other than defective pages, in a physical block, is referred to as a valid cluster ratio, a valid data ratio, or the like. In the GC process, for example, a physical block having a low valid cluster ratio is used as a GC source block. When the GC process is performed on the physical block having the low valid cluster ratio, this physical block becomes a free block. The free block is a physical block where no valid data is stored. When the erase process is executed on the physical block that is the free clock, this physical block may be supplied again as a write destination block.

The GC control module 123 executing the first GC process operates as described below.

First, the GC control module 123 selects a block having a low valid cluster ratio by using the block information provided by the block management module 121. The GC control module 123 copies valid data of data stored in the GC source block to the GC destination block supplied by the block management module 121. At this time, the GC control module 123 may use the GC buffer 233. In addition, the block management module 121 performs the erase process on one of the free blocks and supplies the free block as the GC destination block to the GC control module 123. When all the valid data stored in the GC source block is copied to the GC destination block, the GC source block becomes a free block. In the following descriptions, writing data into the NAND memory 5 by executing the first GC process is also referred to as GC write (or a GC write operation).

An execution cycle of the first GC process by the GC control module 123 will be described here.

As described above, the block management module 121 manages at least the total number of blocks and the number of free blocks as the block information. The GC control module 123 controls the execution cycle of the first GC process for the purpose of acquiring the free blocks, on the basis of, for example, the number of free blocks or the ratio of the number of free blocks to the total number of blocks. More specifically, the GC control module 123 adjusts the execution cycle to execute the first GC process in a shorter cycle as the number of free blocks is smaller.

The GC control module 123 adjusts the execution cycle on the basis of the execution ratio of writing data in accordance with requests of the host 2 by the write/read control module 122 (i.e., host write operations) to writing data by the first GC process (i.e., GC write operations). That is, the GC control module 123 adjusts the execution cycle of the first GC process such that the host write operations are not delayed beyond a permissible range due to the GC write operations.

The execution ratio of host write operations to GC write operations is referred to as, for example, a gear ratio. Increasing the ratio of GC write operations to host write operations is referred to as increasing the gear ratio. When assuming that the number of times of host write operations and the number of times of GC write operations per unit period are A and B, respectively, the gear ratio is represented as A:B. In this case, when A host write destination blocks are consumed by host write operations, B GC destination blocks are consumed by the GC write operations. The GC control module 123 adjusts the execution cycle of the first GC process by adjusting the gear ratio such that the value B becomes larger to the value A as the number of free blocks is smaller.

In this case, the GC control module 123 may execute the first GC process so as to form free blocks whose number is at least (A+B) or multiples of (A+B).

In addition, when a sufficient number of free blocks exist and further formation is unnecessary, when no block having a small valid cluster ratio exists and efficiently forming a free block cannot be expected, or the like, the GC control module 123 may stop the first GC process.

Figure 4:
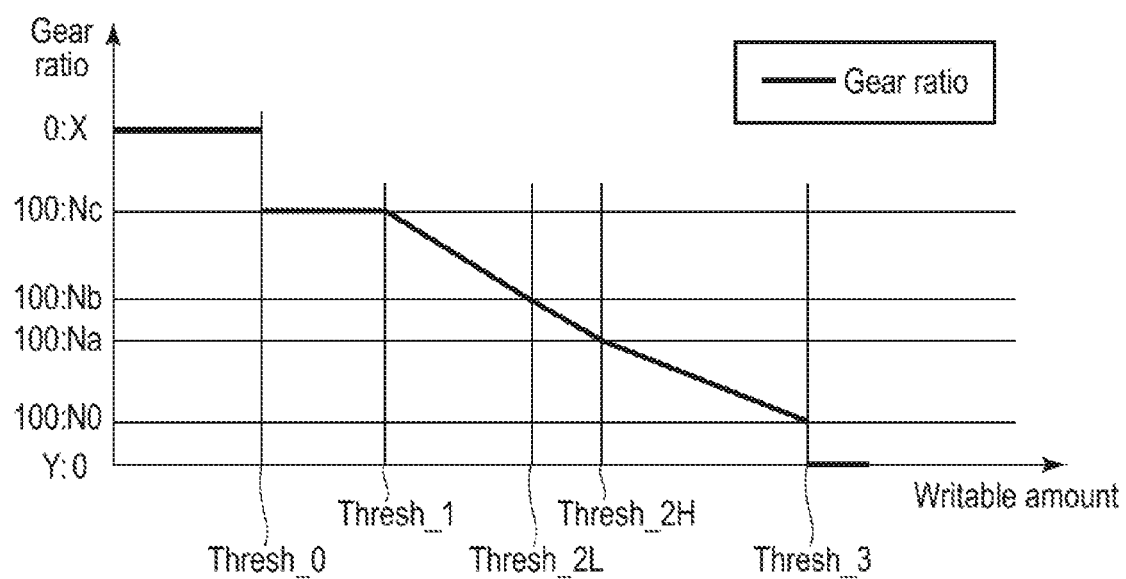
FIG. 4 is a graph illustrating a gear ratio calculated in the memory system of the embodiment.

FIG. 4 is a graph illustrating an example of a gear ratio calculated by the GC control module 123.

In FIG. 4, the vertical axis indicates the gear ratio and the horizontal axis indicates the writable amount of data remaining in the NAND memory 5. The writable amount of data may be the number of free blocks, or may be the number of free pages (i.e., pages where data is writable but unwritten) whose granularity is smaller than a block. An example of using the number of free blocks as the writable amount of data will be described here.

The gear ratio of 100:N0 indicates that N0 GC write operations are executed while 100 host write operations are executed. In addition, the gear ratio of 100:Na, the gear ratio of 100:Nb, and the gear ratio of 100:Nc indicates that Na GC write operations, Nb GC write operations, and Nc GC write operations are executed, respectively, while 100 host write operations are executed. Note that N0<Na<Nb<Nc.

The gear ratio of 0:X indicates a state where the first GC process needs to be executed urgently, and thus stopping host write operations and executing GC write operations (that is, executing X GC write operations while zero host write operation is executed). In addition, the gear ratio of Y:0 indicates stopping GC write operations and executing host write operations (that is, executing zero GC write operations while Y host write operations are executed).

Thresh_0, Thresh_1, Thresh_2L, Thresh_2H, and Thresh_3 on the horizontal axis, which indicates the writable amount of data, are threshold values set to derive the gear ratio from the writable amount of data.

For example, when the writable amount of data is larger than Thresh_3, the GC control module 123 calculates the gear ratio of Y:0 and stops the first GC process. When the writable amount of data is smaller than Thresh_0, the GC control module 123 calculates the gear ratio of 0:X and the write/read control module 122 stops host write operations. That is, the gear ratio of 0:X is a gear ratio in an urgent state where host write operations are stopped and GC write operations are executed preferentially.

When the writable amount of data is larger than or equal to Thresh_0 and smaller than or equal to Thresh_1, the GC control module 123 calculates the gear ratio of 100:Nc. The gear ratio of 100:Nc is a gear ratio at which the ratio of GC write operations to host write operations is maximum except for the gear ratio in the above-described urgent state, and is also referred to as a maximum gear ratio. That is, the maximum gear ratio indicates the maximum execution ratio of GC write operations according to the first GC process to host write operations.

The GC control module 123 may calculate the maximum gear ratio using the overprovisioning ratio (i.e., overprovisioning (OP)) of the NAND memory 5 in addition to the writable amount of data. The overprovisioning ratio is managed by, for example, the block management module 121. The block management module 121 may calculate the overprovisioning ratio with the following expression.

Overprovisioning ratio [%]=(maximum storage capacity−user capacity−system capacity−capacity of invalidated areas)/user capacity×100

The maximum storage capacity is the implemented size (physical size) where the NAND memory 5 can store data. The user capacity is a storage capacity available for storage of user data. The system capacity is a storage capacity available for storage of system management data. The capacity of the invalidated areas is the capacity of areas that cannot be used for storage of data such as defective blocks.

A difference obtained by subtracting the user capacity, the system capacity, and the capacity of invalidated areas from the maximum storage capacity is referred to as an over provisioning capacity. The overprovisioning ratio may be calculated by multiplying the ratio of the overprovisioning capacity to the user capacity by 100.

With regard to the maximum gear ratio of 100:Nc, Me is varied in accordance with the overprovisioning ratio. More specifically, Nc becomes larger as the overprovisioning ratio is smaller. For example, Nc is varied such that Nc=100 when the overprovisioning ratio is 110% or more, Nc=110 when the overprovisioning ratio is 100%, Nc=220 when the overprovisioning ratio is 50%, and Nc=1100 when the overprovisioning ratio is 10%.

In addition, when the writable amount of data is Thresh_3, the GC control module 123 calculates the gear ratio of 100:N0. When the writable amount of data is Thresh_2H, the GC control module 123 calculates the gear ratio of 100:Na. When the writable amount of data is Thresh_2L, the GC control module 123 calculates the gear ratio of 100:Nb.

When the writable amount, of data is larger than Thresh_1 and smaller than Thresh_2, the GC control module 123 calculates the gear ratio corresponding to the current writable amount of data by performing linear interpolation between the gear ratio in a case where the writable amount of data is Thresh_1 (i.e., 100:Nc) and the gear ratio in a case where the writable amount of data is Thresh_2L (i.e., 100:Nb). When the writable amount of data is larger than Thresh_2L and smaller than Thresh_2H, the GC control module 123 calculates the gear ratio corresponding to the current writable amount of data oy performing linear interpolation between the gear ratio in a case where the writable amount of data is Thresh_2L (i.e., 100:Nb) and the gear ratio in a case where the writable amount of data is Thresh_2H (i.e., 100:Na). When the writable amount of data is larger than Thresh_2H and smaller than Thresh_3, the GC control module 123 calculates the gear ratio corresponding to the current writable amount of data by performing linear interpolation between the gear ratio in a case where the writable amount of data is Thresh_2H (i.e., 100:Na) and the gear ratio in a case where the writable amount of data is Thresh_3 (i.e., 100:N0).

The example of setting two threshold values (i.e., Thresh_2L and Thresh_2H) between Thresh_1 and Thresh_3 has been described. However, this is a mere example and setting the threshold values to derive the gear ratio from the writable amount of data may be variously modified. For example, three or more threshold values may be defined between Thresh_1 and Thresh_3.

Thus, the GC control module 123 calculates the gear ratio on the basis of the writable amount of data remaining in the NAND memory 5. In addition, the GC control module 123 calculates the maximum gear ratio on the basis of the writable amount of the data remaining in the NAND memory 5, and the overprovisioning ratio. The GC control module 123 executes calculation of the gear ratio in accordance with, for example, variation of the number of free blocks. The GC control module 123 may execute calculation of the gear ratio in each specific period. The GC control module 123 receives the number of free locks, i.e., the writable amount of data remaining in the NAND memory 5, from the block management module 121. The GC control module 123 may further receive the overprovisioning ratio from the block management module 121.

The descriptions return to FIG. 1 and continue explanations of each processing module in the control unit 12.

The refresh control module 124 executes a first refresh process. The first refresh process is a refresh process for a block storing user data (i.e., a refresh source block). The refresh control module 124 executes the first refresh process for the purpose of maintaining user data, resulting from an error of a read operation or a write operation for the NAND memory 5. More specifically, the refresh control module 124 manages block information of blocks that need to be refreshed, selects a refresh source block from the blocks, and executes the first refresh process on the refresh source block. The blocks that need to be refreshed may include a block where a time mere than or equal to a threshold value has passed after the data is written, a block in which read errors occur at the number of times more than or equal to a threshold value, a block for which error corrections more than or equal to a threshold value are executed during a read operation, a block having a bit error rate (BER) that is more than or equal to threshold value, and a block having the number of errors per certain data amount that is larger than or equal to a threshold value.

The refresh control module 124 executing the first refresh process operates as described below.

First, the refresh control module 124 selects a refresh source block using block information of blocks that need to be refreshed and are managed by itself. The refresh control module 124 copies valid data of data stored in the refresh source block to a refresh destination block that is supplied by the block management module 121. At this time, the refresh control module 124 may use the refresh buffer 234. In addition, the block management module 121 executes the erase process for one of the free blocks and supplies the free block as the refresh destination block to the refresh control module 124. When all the valid data stored in the refresh source block is copied to the refresh destination block, the refresh source block becomes a free block. In the following descriptions, writing data to the NAND memory 5 by performing the first refresh process is also referred to as refresh write (or a refresh write operation).

The LUT write control module 125 writes data of the LUT 22 to an LUT write destination block to update the LUT 22 in accordance with host write, GC write, and/or refresh write. The block management module 121 executes the erase process for one of the free blocks and supplies the free block as an LUT write destination block to the LUT write control module 125. Data of the LUT 22 indicates mapping between a logical address and a physical address.

The LUT GC control module 126 executes a second GC process. The second GC process is a GC process for a block storing system management data (i.e., a GC source block). An example where the system management data is the LUT 22 will be described below, but the other system management data that may cause a state that the actual write amount is different from the estimated amount may be further included. Note that a block allocated to store system management data is also referred to as an LUT block.

The LUT GC control module 126 executing the second GC process operates as described below.

First, the LUT GC control module 126 selects the first erased LUT block (that is, an LUT block where the longest time has passed since the previous erase operation is performed on the LUT block) or the LUT block having a small valid cluster ratio, from the LUT blocks storing system management data, as an LUT GC source block, by using the block information provided by the block management module 121. The LUT GC control module 126 copies valid data of the data stored in the LUT GC source block to an LUT GC destination block that is supplied by the block management module 121. At this time, the LUT GC control module 126 may use an allocated area in the SDRAM 6 as a buffer area. The block management module 121 executes the erase process for one of the free blocks and supplies the free block as the LUT GC destination block to the LUT GC control module 126. When all the valid data stored in the LUT GC source block is copied to the LUT GC destination block, the LUT GC source block becomes a free block. In the following descriptions, writing data to the NAND memory 5 by performing the second GC process is also referred to as LUT GC write (or an LUT GC write operation).

The LUT GC control module 126 may calculate an LUT gear ratio and adjust an execution cycle of the second GC process. The second GC process is executed such that the size of LUT blocks is controlled not to exceed a predetermined size set for each device capacity. The LUT gear ratio indicates the execution ratio of write operations by the second GC process to write operations of system management data executed by the LUT write control module 125 in accordance with write requests of the host 2, the first GC process, and the first refresh process. The LUT GC control module 126 determines the LUT gear ratio by comparing the current number of LUT blocks in the NAND memory 5 with threshold values of multiple stages.

The LUT refresh control module 127 executes a second refresh process. The second refresh process is a refresh process for an LUT block storing system management data (for example, the LUT 22) (i.e., an LUT refresh source block). The LUT refresh control module 127 executes the second refresh process for the purpose of maintaining system management data, resulting from an error of a read operation or write operation on an LUT block. The LUT refresh control module 127 selects an LUT refresh source block from the LUT blocks, similarly to the refresh control module 124.

The LUT refresh control module 127 executing the second refresh process operates as described below.

First, the LUT refresh control module 127 selects an LUT refresh source block using the block information provided by the block management module 121. The LUT refresh control module 127 copies valid data of the data stored in the LUT refresh source block to an LUT refresh destination block that is supplied by the block management module 121. At this time, the LUT refresh control module 127 may use an allocated area in the SDRAM 6 as a buffer area. The block management module 121 executes the erase process for one of the free blocks and supplies the free block as the LUT refresh destination block to the LUT refresh control module 127. When all the valid data stored in the LUT refresh source block is copied to the LUT refresh destination block, the LUT refresh source block becomes a free block. In the following descriptions, writing data to the NAND memory 5 by performing the second refresh process is also referred to as LUT refresh write (or an LUT refresh write operation).

The unmap processing module 128 writes data of the LUT 22 to an LUT write destination block to update the LUT 22 in accordance with a request of the host 2 to delete (i.e., unmap) user data stored in the NAND memory 5. The block management module 121 performs the erase process on one of the free blocks and supplies the free block as the LUT write destination block to the unmap processing module 125. The LUT write destination block supplied to the unmap processing module 128 may be a block different from the LUT write destination block supplied to the LUT write control module 125.

More specifically, the unmap processing module 128 receives, for example, an unmap command from the host 2 via the host I/F 11. The received unmap command indicates a logical address of user data to be deleted. The unmap processing module 123 writes data for updating the LUT 22 to the LUT write destination block in accordance with the unmap command, such that the LUT 22 indicates that the logical address is not associated with any physical address. The user data associated with this logical address is thereby invalidated. In the following descriptions, writing LUT data to the NAND memory 5 in accordance with a request for unmapping is also referred to as unmap write (or an unmap write operation).

The write amount monitoring module 129 acquires the actual write amount to the NAND memory 5 in a certain period. In addition, the write amount monitoring module 129 calculates the estimated amount of writing to the NAND memory 5 in the certain period. When the write amount is larger than the estimated amount by the first threshold value or more, the write amount monitoring module 129 determines that the NAND memory 5 is in an excessive write state. The write amount monitoring module 129 notifies a reconfiguration control unit 111 provided in the host I/F 11 of the excessive write state. Note that the reconfiguration control unit 111 may be provided in the control unit 12.

The excessive write state indicates, for example, the following states (1) to (4).

(1) A state where the consumed amount of the NAND memory 5 is large relative to the write amount required by the host 2.

(2) A state where GC is executed more than necessary relative to the write amount required by the host 2.

(3) A state where refresh is executed more than necessary relative to the data amount required to be refreshed.

(4) A state where the consumed amount of the NAND memory 5 for system management data is large relative to the updated amount of system management data (LUT 22) that occurs in accordance with a write request of the host 2, GC, and refresh.

When the excessive write state in the NAND memory 5 continues, the wear of the NAND memory 5 is accelerated.

For this reason, there is a risk that the SSD 3 may be broken earlier than the operation guarantee period (for example, five years).

When the write amount monitoring module 129 notifies the reconfiguration control unit 111 of the excessive write state, the reconfiguration control unit 111 changes (reconfigures) one or more parameters that are used to write data into the NAND memory 5 by operating in cooperation with each module in the control unit 12. At this time, the reconfiguration control unit 111 may reboot at least a part of the memory controller 4 (in this example, the control unit 12). The control unit 12 changes the one or more parameters in accordance with being rebooted.

In addition, when the write amount monitoring module 129 notifies the reconfiguration control unit 111 of the excessive write state and an unnecessary flush process is performed on the NAND memory 5, the reconfiguration control unit 111 stops the unnecessary flush process by operating in cooperation with each module in the control unit 12. The flush process is a process of writing, when data to be written into a write destination block does not satisfy a write unit, the data to which invalid data is added to form the write unit. The unnecessary flush process is, for example, a flush process of continuing writing invalid data beyond a specific amount. The specific amount is an amount corresponding to a logical page, the amount corresponding to a physical block, the amount corresponding to a block group, or the like. In addition, in this case, the reconfiguration control unit 111 may reboot at least a part of the memory controller 4 (in this example, the control unit 12). The control unit 12 stops the unnecessary flush process in accordance with being rebooted.

Acquisition of the actual write amount, calculation of the estimated amount or writing, and detection and handling of an excessive write state, in a specific period, will be concretely described below. An example where this specific period is a first period will be described.

Acquisition of Actual Write Amount

The write amount monitoring module 129 acquires, in cooperation with the write/read control module 122, the GC control module 123, the refresh control module 124, the LUT write control module 125, the LUT GC control module 126, the LUT refresh control module 127, and the unmap processing module 128, the data amount that is actually written to the NAND memory 5 in the first period by each of the modules 122 to 128. The data actually written to the NAND memory 5 by each of the modules 122 to 128 includes invalid data written with the flush process.

More specifically, the write/read control module 122 measures the cumulative amount of data written to the NAND memory 5, in accordance with a request of the host 2 (for example, a write command received from the host 2) (hereinafter referred to as a host write cumulative amount). The write amount monitoring module 129 receives the host write cumulative amount measured by the write/read control module 122, in each specific period (i.e., a specific cycle) corresponding to the first period. Then, the write amount monitoring module 129 calculates the data amount obtained by subtracting the previously received host write cumulative amount from the currently received host write cumulative amount, as the host write amount of the first period.

The GC control module 123 measures the cumulative amount of data that is written to the NAND memory 5 by performing the first GC process on blocks storing user data (hereinafter referred to as a GC write cumulative amount).

The write amount monitoring module 129 receives the GC write cumulative amount measured by the GC control module 123, in each specific period. Then, the write amount monitoring module 129 calculates the data amount obtained by subtracting the previously received GC write cumulative amount from the currently received GC write cumulative amount, as the GC write amount of the first period.

The refresh control module 124 measures the cumulative amount of data that is written to the NAND memory 5 by performing the first refresh process on blocks storing user data (hereinafter referred to as a refresh write cumulative amount). The write amount monitoring module 129 receives the refresh write cumulative amount measured by the refresh control module 124, in each specific period. Then, the write amount monitoring module 129 calculates the data amount obtained by subtracting the previously received refresh write cumulative amount from the currently received refresh write cumulative amount, as the refresh write amount of the first period.

The LUT write control module 125 measures the cumulative amount of system management data that is written to the NAND memory 5 in accordance with host write operations by the write/read control module 122, the GC write operations by the GC control module 123, and the refresh write operations by the refresh control module 124. The LUT refresh control module 127 measures the cumulative amount of data that is written to the NAND memory 5 by performing the second refresh process on blocks storing system management data. The LUT GC control module 126 measures the cumulative amount of system management data that is written to the NAND memory 5 by performing the second SC process on blocks storing system management data. The LUT refresh control module 127 measures the cumulative amount of data that is written to the NAND memory 5 by performing the second refresh process on blocks storing system management data. The unmap processing module 128 measures the cumulative amount of system management data that, is written to the NAND memory 5 in accordance with requests of the host 2 to delete user data stored in the NAND memory 5 (for example, an unmap command received from the host 2).

The write amount monitoring module 129 receives the cumulative amounts measured by the LUT write control module 125, the LUT GC control module 126, the LUT refresh control module 127, and the unmap processing module 128, respectively, in each specific period. The write amount monitoring module 129 calculates a sum of the four received cumulative amounts to acquire the LUT write cumulative amount. Then, the write amount monitoring module 129 calculates the data amount obtained by subtracting the previously acquired LUT write cumulative amount from the currently acquired LUT write cumulative amount, as the LUT write amount of the first period.

According to the above-described configuration, the write amount monitoring module 129 can acquire the actual host write amount, GC write amount, refresh write amount, and LUT write amount written in the first period.

Calculation of Estimated Amount of Writing

The write amount monitoring module 129 calculates, in cooperation with the write/read control module 122, the GC control module 123, the refresh control module 124, the LUT write control module 125, the LUT GC control module 126, the LUT refresh control module 127, and the unmap processing module 128, the data amount that is estimated to be written to the NAND memory 5 in a specific period by each of the modules 122 to 128. The estimated data amounts do not include the data amount of data written with the flush process.

More specifically, the host I/F 11 calculates the cumulative amount of data that is required to be written by the host 2 (hereinafter referred to as a host write request cumulative amount), on the basis of requests of the host 2 (for example, write commands received from the host 2). The write amount monitoring module 129 receives the host write cumulative amount calculated by the host I/F 11 in each specific period. Then, the write amount monitoring module 129 calculates the data amount obtained by subtracting the previously received host write request cumulative amount from the currently received host write request cumulative amount, as the estimated amount of host write that is estimated to be written to the NAND memory 5 in the first period.

The GC control module 123 calculates the maximum execution ratio (i.e., the maximum gear ratio) of write operations by performing the first GC process to write operations in accordance with write requests of the host 2, by using the writable amount of data remaining in the NAND memory 5 and the overprovisioning ratio of the NAND memory 5. The first GC process is a GC process for a block storing user data as described above. The write amount monitoring module 129 acquires the maximum gear ratio calculated by the GC control module 123 in each specific period. The write amount monitoring module 129 calculates the estimated amount of GC write estimated to be written to the NAND memory 5 in the first period with the first GC process, by using the actual host write amount and the maximum gear ratio in the first period. For example, when the maximum gear ratio is 1:3, the write amount monitoring module 129 calculates the estimated amount of GC write by multiplying the actual host write amount by the execution ratio of the GC write to the host write, i.e., 3 (=3/1).

The refresh control module 124 calculates the cumulative amount, of data on which the first refresh process is needed to be performed (hereinafter referred to as a refresh request cumulative amount). The first refresh process is a refresh process for a block storing user data as described above. The refresh control module 124 calculates the cumulative amount of valid data included in refresh source blocks on which the first refresh process is to be performed, as the refresh request cumulative amount. The write amount monitoring module 129 acquires the refresh request cumulative amount calculated by the refresh control module 124 in each specific period. The write amount monitoring module 129 calculates the data amount obtained by subtracting the previously acquired refresh request cumulative amount from the currently acquired refresh request cumulative amount, as the estimated amount of refresh write on which the first refresh process is to be newly performed in the first period.

The write amount monitoring module 129 calculates the data amount of system management data (for example, the LUT 22) estimated to be written to the NAND memory 5 in the first period, on the basis of the actual host write amount, GC write amount, and refresh write amount in the first period. The sum of the actual host write amount, GC write amount, and refresh write amount in the first period indicates the total amount of user data written to the NAND memory 5 in the first period. The write amount monitoring module 129 calculates the data amount of the LUT 22 that is estimated to be written to the NAND memory 5 in accordance with writing the total amount of user data. Hereinafter, the calculated data amount of the LUT 22 is referred to as a first LUT write estimated amount.

In addition, the LUT GC control module 126 calculates the execution ratio (i.e., the LUT gear ratio) of write operations by performing the second GC process to write operations of system management data executed by the LUT write control module 125 in accordance with write requests of the host 2, the first GC process, and the first refresh process, by using the write amount of system management data occupying the NAND memory 5 (for example, the current number of LUT blocks in the NAND memory 5). The second GC process is a GC process for LUT blocks storing system management data as described above. The LUT GC control module 126 may calculate the execution ratio of the worst case of the second GC process on the LUT 22. The write amount monitoring module 129 acquires the execution ratio calculated by the LUT GC control module 126 in each specific period.

Furthermore, the LUT refresh control module 127 calculates the cumulative amount of data on which the second refresh process is needed to be performed (hereinafter referred to as an LUT refresh request cumulative amount). The second refresh process is a refresh process for LUT blocks storing system management data as described above. The write amount monitoring module 129 receives the LUT refresh request cumulative amount measured by the LUT refresh control module 127 in each specific period. The write amount monitoring module 129 calculates the data amount obtained by subtracting the previously received LUT refresh request cumulative amount from the currently received LUT refresh request cumulative amount, as the estimated amount of LUT refresh write on which the second refresh process is needed to be newly performed in the first period.

Then, the write amount monitoring module 129 calculates the estimated amount of system management data estimated to be written to the NAND memory 5 in the first period, by using the first LUT write estimated amount, the execution ratio, and the estimated amount of LUT refresh write in the first period. Incidentally, the first LUT write estimated amount may include the data amount of the LUT 22 that is estimated to be written to the NAND memory 5 in the first period by the unmap processing module 128 in accordance with a request of the host 2 to delete (unmap) user data stored in the NAND memory 5 (hereinafter referred to as the unmap LUT write estimated amount). That is, the write amount monitoring module 129 may calculate, the estimated amount of system management data (e.g., the estimated amount of LUT write) estimated to be written to the NAND memory 5 in the first period, by using the unmap LUT write estimated amount, the first LUT write estimated amount, the execution ratio, and the estimated amount of LUT refresh write. For example, the write amount monitoring module 129 calculates the estimated amount of LUT write with the following expression.

Estimated amount of LUT write=(first LUT write estimated amount+unmap LUT write estimated amount)×GC coefficient+estimated amount of LUT refresh write The GC coefficient is the sum of two values that indicate the execution ratio of the worst case of the second GC process on the LUT 22. For example, when the execution ratio of the worst case of the second GC process on the LUT 22 is 1:3, the GC coefficient is 4 (=1+3).

According to the above-described configuration, the write amount monitoring module 129 can acquire the estimated amount of host write, the estimated amount of GC write, the estimated amount of refresh write, and the estimated amount of LUT write in the first period.

Detection and Handling of Excessive Write State

The write amount monitoring module 129 determines whether the NAND memory 5 is in an excessive write state or not, by using the actual host write amount, the actual GC write amount, the actual refresh write amount, and the actual LUT write amount in the first period, and the estimated amount of host write, the estimated amount of GC write, the estimated amount of refresh write, and the estimated amount of LUT write in the first period, which are acquired with the above-described method.

Incidentally, as described above, a flush process of writing invalid data to a write destination block (for example, executing NullPadding) may be performed in any one of a host write operation, a GC write operation, a refresh write operation, and an LUT write operation.

For example, when a read error or a write error occurs in a write destination block, desirably, the other block is supplied as a new write destination block and the refresh process is performed on the block where the error occurs as soon as possible. For this reason, after the error occurs in the write destination block, the flush process of writing invalid data to the write destination block is executed in order to complete writing of data in units of a logical page or a block group early.

Host write operations and GC write operations are controlled in accordance with the gear ratio. For example, when the gear ratio is 1:3, a phase of executing a host write operation of data for one page and a phase of executing GC write operations of data for three pages proceed alternately. However, when a write command is not received from the host 2 or when a GC source block is not selected, one of the phases is not completed and cannot be transitioned to the ether phase. For this reason, for example, when the phase of host write operations does not transition to the phase of GC write operations after a certain time has elapsed because a write command is not received from the host 2, the flush process of writing invalid data to the host write destination block is executed. In addition, for example, when the phase of GC write operations does not transition to the phase of host write operations after a certain time has elapsed because a GC source block is not selected, the flush process of writing invalid data to the GC destination block is executed.

Since invalid data is written to the write destination block due to occurrence of such a flush process, the actual write amount to the NAND memory 5 may be larger than the estimated write amount.

Furthermore, the actual write amount may become larger than the estimated write amount for the reasons that the flush process occurs continuously, that the gear ratio becomes inappropriate, that a GC source block and/or a refresh source block are selected inappropriately, and the like.

Thus, the write amount monitoring module 129 of the present embodiment detects an excessive write state by comparing the actual write amount with the estimated write amount. For example, when the actual write amount is larger than the estimated write amount by the first threshold value or more, the write amount monitoring module 129 determines that the NAND memory 5 is in an excessive write state.

More specifically, for example, the write amount monitoring module 129 determines that the NAND memory 5 is in an excessive write state when fulfilling at least any one of the following conditions (1) to (4).

(1) The host write amount is larger than the estimated amount of host write by a threshold value or mere.
(2) The GC write operations amount is larger than the estimated amount of GC write by a threshold value or more.
(3) The refresh write amount is larger than the estimated amount of refresh write by a threshold value or more.
(4) The LUT write amount is larger than the estimated amount of LUT write by a threshold value or more.

The threshold values of the conditions (1) to (4) may be the same values or different values. The threshold values may be expressed with amounts or ratios of amounts. The write amount monitoring module 129 notifies the reconfiguration control unit 111 that the NAND memory 5 is in an excessive write state when fulfilling at least any one of the conditions (1) to (4).

Alternatively, the write amount monitoring module 129 may notify the reconfiguration control unit 111 of the type of write operation which causes the excessive write. That is, when fulfilling the condition (1), the write amount monitoring module 129 notifies the reconfiguration control unit 111 that the excessive write occurs in a host write operation. In addition, the write amount monitoring module 129 notifies the reconfiguration control unit 111 that the excessive write occurs in a GC write operation when fulfilling the condition (2), that the excessive write occurs in a refresh write operation when fulfilling the condition (3), and that the excessive write occurs in an LUT write operation when fulfilling the condition (4).

When the reconfiguration control unit 111 is notified that the NAND memory 5 is in the excessive write state, the reconfiguration control unit 111 causes the control unit 12 to change one or more parameters used tor writing data to the NANO memory 5. In addition, when the reconfiguration control unit 111 is notified that the NAND memory 5 is in the excessive write state, the reconfiguration control unit 111 may cause the control unit 12 to stop an unnecessary flush process performed on the NAND memory 5.

Note that when the reconfiguration control unit 111 is notified that the NAND memory 5 is in the excessive write state, the reconfiguration control unit 111 may reboot the control unit 12. The control unit 12 may change the one or more parameters used for writing data to the NAND memory 5 and stop the unnecessary flush process performed on the NAND memory 5, in accordance with being rebooted.

More specifically, when the reconfiguration control unit 111 is notified that the NAND memory 5 is in the excessive write state, the reconfiguration control unit 111 makes at least one of the following operations.

The reconfiguration control unit 111 causes the write/read control module 122 to stop an unnecessary flush process for a host write operation and change parameters for the host write operation.

The reconfiguration control unit 111 causes the GC control module 123 to stop an unnecessary flush process for a GC write operation and change parameters for the first GC process. The parameters for the first GC process include, for example, the execution ratio (gear ratio) of GC write operations to host write operations, a selection condition of a GC source block for the first GC process, and GC target block information indicative of a GC source block for the first GC process. For example, the GC control module 123 calculates again the gear ratio on the basis of the storage amount of data remaining in the NAND memory 5.

The reconfiguration control unit 111 causes the refresh control module 124 to stop the unnecessary flush process for a refresh write operation and change parameters for the first, refresh process. The parameters for the first refresh process may include the write cycle of refresh write, a selection condition of a refresh source block for the first refresh process, refresh target block information indicative of refresh source blocks for the first refresh process. The refresh target block information includes a list for managing refresh source blocks on the basis of, for example, error severity.

When changing the parameter for the first refresh process, for example, the refresh control module 124 calculates again the write cycle of refresh write on the basis of the number of refresh source blocks and the error severity of each block, by using the refresh target block information. This write cycle is longer when the number of the refresh source blocks is small, and shorter when the number of the refresh source blocks is large.

Furthermore, the refresh control module 124 may select again a refresh source block for the first refresh process from blocks storing user data. This is because while a refresh source block is not supplied, the flush process performed on the refresh destination block may occur continuously.

The reconfiguration control unit 111 causes at least any one of the LUT write control module 125, the LUT GC control module 126, the LUT refresh control module 127, and the unmap processing module 128 to stop an unnecessary flush process for an LUT write operation and to change parameters for the LUT write operation. The parameters for the LUT write operation may include the execution ratio of LUT GC write operations to LUT write operations that correspond to host write operations, GC write operations and refresh write operations (i.e., LUT gear ratio), the write cycle of an LUT refresh write operation, a selection condition of a clock for the second refresh process, and refresh target block information indicative of blocks for the second refresh process.

Incidentally, when notified of the type of the write operation that causes the excessive write to happen, the reconfiguration control unit 111 may execute the operation corresponding to the notified type of the write operation, of the above-described operations. That is, when the reconfiguration control unit 111 is notified that excessive write occurs in a host write operation, the reconfiguration control unit 111 causes the write/read control module 122 to stop the unnecessary flush process of the host write operation and to change the parameters of the host write operation. When the reconfiguration control unit 111 is notified that excessive write occurs in a GC write operation, the reconfiguration control unit 111 causes the GC control module 123 to stop the unnecessary flush process of the GC write operation and to change the parameters of the first GC process. When the reconfiguration control unit 111 is notified that excessive write occurs in a refresh write operation, the reconfiguration control unit 111 causes the refresh control module 124 to stop the unnecessary flush process of the refresh write operation and to change the parameters of the first refresh process. When the reconfiguration control unit 111 is notified that excessive write occurs in an LUT write operation, the reconfiguration control unit 111 causes at least any one of the LUT write control module 125, the LUT GC control module 126, the LUT refresh control module 127, and the unmap processing module 128 to stop the unnecessary flush process of the LUT write operation and to change the parameters of the LUT write operation.

Note that when the write amount monitoring module 129 determines that the NAND memory 5 is in an excessive write state, sequentially, at a specific number of times or more, or in a specific period or longer, the write amount monitoring module 129 may notify the reconfiguration control unit 111 that the NAND memory 5 is in an excessive write state. For example, the write amount monitoring module 129 determines whether the NAND memory 5 is in an excessive write state or not, in every six hours. Then, when the write amount monitoring module 129 determines that the NAND memory 5 is in an excessive write state, sequentially, at a specific number of times (for example, four times), the write amount monitoring module 129 notifies the reconfiguration control unit 111 that the NAND memory 5 is in an excessive write state.

In addition, the write amount monitoring module 129 may further consider DWPD of the SSD 3 to determine whether the NAND memory 5 is in an excessive write state or not. The write amount monitoring module 129 calculates the maximum rewritable amount of the NAND memory 5 that is tolerable in the first period, on the basis of DWPD. When the actual write amount in the first period is larger than the calculated maximum rewritable amount of the first period by the second threshold value or more, the write amount monitoring module 129 determines that the NAND memory 5 is in an excessive write state. That is, when the actual write amount in the first period is larger than the value obtained by subtracting the second threshold value from the calculated maximum rewritable amount of the first period, it is determined that the NAND memory 5 is in an excessive write state by the write amount monitoring module 129. In this case, the reconfiguration control unit 111 causes the control unit 12 to change one or more parameters used for writing data to the NAND memory 5 and to stop the unnecessary flush process to the NAND memory 5. Note that the second threshold value is different from the first threshold value.

On the other hand, when the actual write amount in the first period is smaller than the calculated maximum rewritable amount of the first period by the second threshold value or more, the write amount monitoring module 129 determines that the NAND memory 5 is not in an excessive write state. In this case, the reconfiguration control unit 111 does not cause the control unit 12 to change the one or more parameters used for writing data to the NAND memory 5 or to stop the unnecessary flush process on the NAND memory 5. Thus, when the actual write amount is sufficiently lower than the maximum rewritable amount based on DWPD, the control unit 12 does not change the parameters. Therefore, delay of the process which occurs due to change of the parameters can be avoided.

In other words, when the actual write amount in the first period is larger than the estimated amount by the first threshold value or more and when the difference obtained by subtracting the actual write amount from the calculated maximum rewritable amount of the first, period is smaller than the second threshold value, the write amount monitoring module 129 may determine that the NAND memory 5 is in the excessive write state. In this case, the reconfiguration control unit 111 causes the control unit 12 to change the one or more parameters used for writing data to the NAND memory 5 and to stop the unnecessary flush process on the NAND memory 5.

According to the above-described configuration, the memory controller 4 can extend the lifetime of the NAND memory 5. The memory controller 4 can detect the excessive write state of the NAND memory 5 by using the actual write amounts and the estimated amounts of host write, GC write, refresh write, and LUT write. Then, when the NAND memory 5 is in the excessive write state, the memory controller 4 changes the parameters of actual write operations on the NAND memory 5 and stops the unnecessary flush process. Thus, the memory controller 4 can suppress unnecessary wear of the NAND memory 5 and extend the lifetime of the NAND memory 5.

Figure 5:
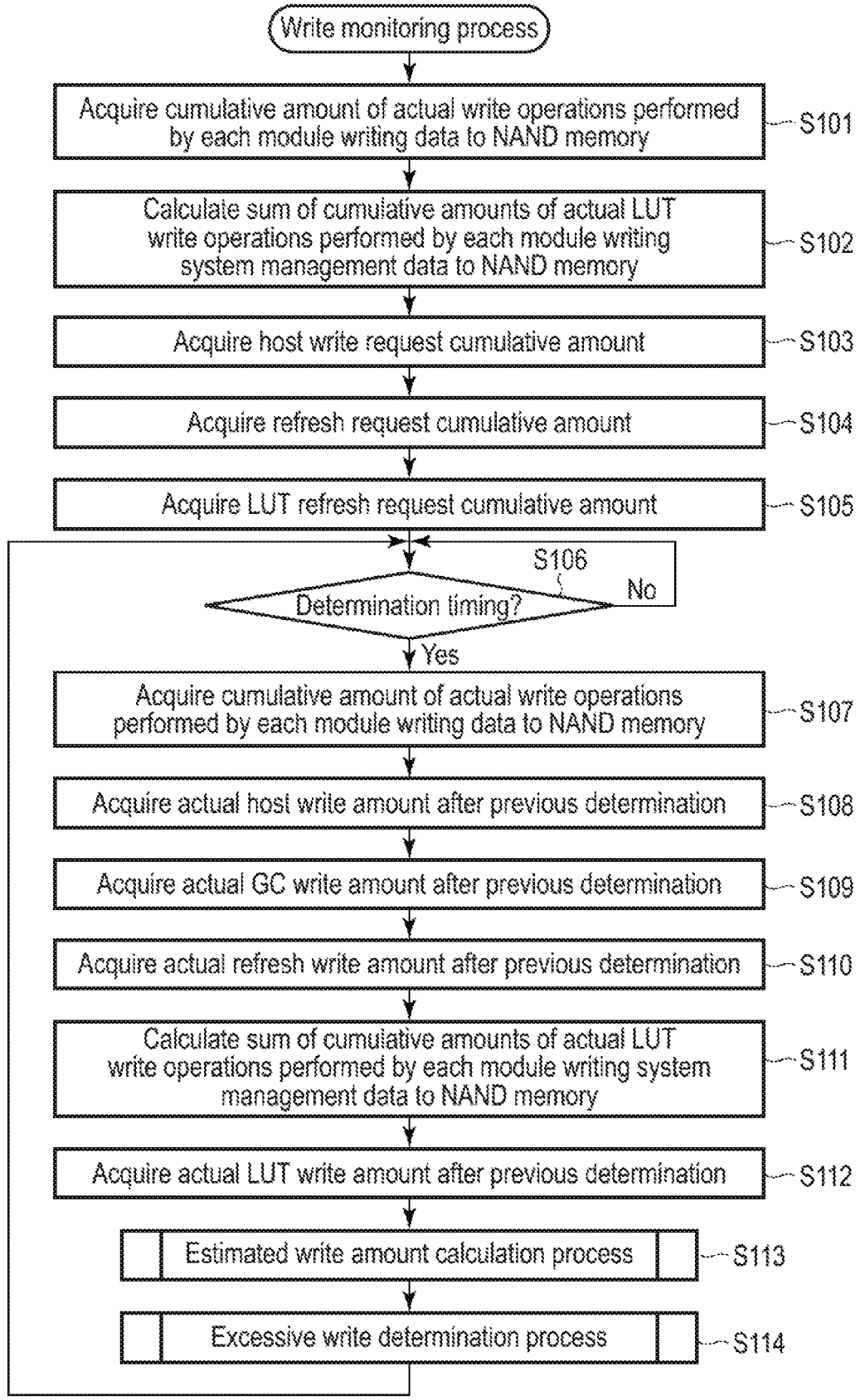
FIG. 5 is a flowchart illustrating an example of a procedure of a write monitoring process executed in the memory system of the embodiment.

FIG. 5 is a flowchart illustrating an example of a procedure of a write monitoring process executed by the write amount monitoring module 129. The write amount monitoring module 129 starts the write monitoring process in accordance with, tor example, booting (or rebooting) of the control unit 12.

The write amount, monitoring module 129 acquires the cumulative amount (i.e., a total amount) of actual write operations on the NAND memory 5 that are performed by each of the modules that execute writing data to the NAND memory 5 (more specifically, the write/read control module 122, the GC control module 123, the refresh control module 124, the LUT write control module 125, the LUT GC control module 126, the LUT refresh control module 127, and the unmap processing module 128) (S101). The write amount monitoring module 129 may acquire the cumulative amount of actual write operations by sending an inquiry to each of the modules 122 to 128 or may read the actual write amount of each of the modules 122 to 128 from a specific storage area (for example, a storage area in the SDRAM 6).

The write amount monitoring module 129 uses the cumulative amount of actual write operations on the NAND memory 5 (i.e., an actual LUT write cumulative amount) that are performed by each of the modules that execute writing system management data to the NAND memory 5 (more specifically, the LUT write control module 125, the LUT GC control module 126, the LUT refresh control module 127, and the unmap processing module 128) to calculate a sum of the cumulative amounts of the modules (S102). In addition, the write amount monitoring module 129 acquires the cumulative amount of data that is required to be written in accordance with write commands by the host 2 (i.e., the host write request cumulative amount), from the host I/F 11 (S103).

The write amount monitoring module 129 acquires the cumulative amount of data on which the first refresh process is to be performed (i.e., the refresh request cumulative amount), from the refresh control module 124 (S104). In addition, the write amount monitoring module 129 acquires the cumulative amount of data of the LUT 22 on which the second refresh process is to be performed (hereinafter referred to as an LUT refresh request cumulative amount), from the LUT refresh control module 127 (S105).

Next, the write amount monitoring module 129 determines whether it is the timing to determine whether an excessive write occurs or not (S106). The timing to determine whether an excessive write occurs or not is, for example, the timing in each certain time after booting up the control unit 12. When it is not the timing to determine whether an excessive write occurs or not (NO in S106), the process returns to S106 and it is determined again whether it is the timing to determine whether an excessive write occurs or not.

When it is the timing to determine whether an excessive write occurs or not (YES in S106), the write amount monitoring module 129 acquires the cumulative amounts of actual write operations on the NAND memory 5 performed by the write/read control module 122, the GC control module 123, the refresh control, module 124, the LUT write control module 125, the LUT GC control module 126, the LUT refresh control module 127, and the unmap processing module 328, respectively (S107). The write amount monitoring module 129 subtracts, from the acquired cumulative amount of actual write operations executed by the write/read control module 122 (i.e., the actual host write cumulative amount), the actual host write cumulative amount that was acquired for the previous determination of the excessive write, in order to acquire the actual host write amount after the previous determination (S108). Incidentally, when first determining an excessive write after booting up the control unit 12, the write amount monitoring module 129 uses the actual host write cumulative amount acquired in S101 (i.e., the actual host write cumulative amount acquired at booting of the control unit 12) as the actual host write cumulative amount that was acquired tor the previous determination of an excessive write.

The write amount monitoring module 129 subtracts, from the acquired cumulative amount of actual write operations performed by the GC control module 123 (i.e., the actual GC write operations cumulative amount), the actual GC write operations cumulative amount that was acquired for the previous determination of the excessive write, in order to acquire the actual GC write amount after the previous determination (S109). Incidentally, when first determining an excessive write after booting up the control unit 12, the write amount monitoring module 129 uses the actual GC write cumulative amount acquired in S101 as the actual GC write operations cumulative amount that was acquired for the previous determination of an excessive write.

The write amount monitoring module 129 subtracts, from the acquired cumulative amount of actual write operations performed by the refresh control module 124 (i.e., the actual refresh write cumulative amount), the actual refresh write cumulative amount that was acquired for the previous determination of an excessive write, in order to acquire the actual refresh write amount after the previous determination (S110). Incidentally, when first determining an excessive write after booting up the control unit 12, the write amount monitoring module 129 uses the actual refresh write cumulative amount acquired in S101 as the actual refresh write cumulative amount that was acquired for the previous determination of an excessive write.

The write amount monitoring module 129 calculates a sum of the actual LUT write cumulative amounts measured by the LUT write control module 125, the LUT GC control module 126, the LUT refresh control module 127, and the unmap processing module 128, respectively (S111). The write amount monitoring module 129 subtracts, from the calculated sum of the actual LUT write cumulative amounts, the sum of the actual LUT write cumulative amounts that was calculated for the previous determination of an excessive write, in order to acquire the actual LUT write amount after the previous determination (S112). Incidentally, when first determining an excessive write after booting up the control unit 12, the write amount monitoring module 129 uses the sum of the actual LUT write cumulative amounts calculated in S102 as the sum of the actual LUT write cumulative amounts that was calculated for the previous determination of an excessive write.

Next, the write amount monitoring module 129 executes an estimated write amount calculation process for calculating the estimated amounts of host write, GC write, refresh write, and LUT write (S113). An example of a procedure of the estimated write amount calculation process will be described later with reference to a flowchart of FIG. 6.

Then, the write amount monitoring module 129 executes an excessive write determination process for determining whether excessive write occurs, by using the actual amounts and estimated amounts of host write, GC write, refresh write, and LUT write (S114). An example of the procedure of the excessive write determination process will be described later with reference to a flowchart of FIG. 7.

Figure 6:
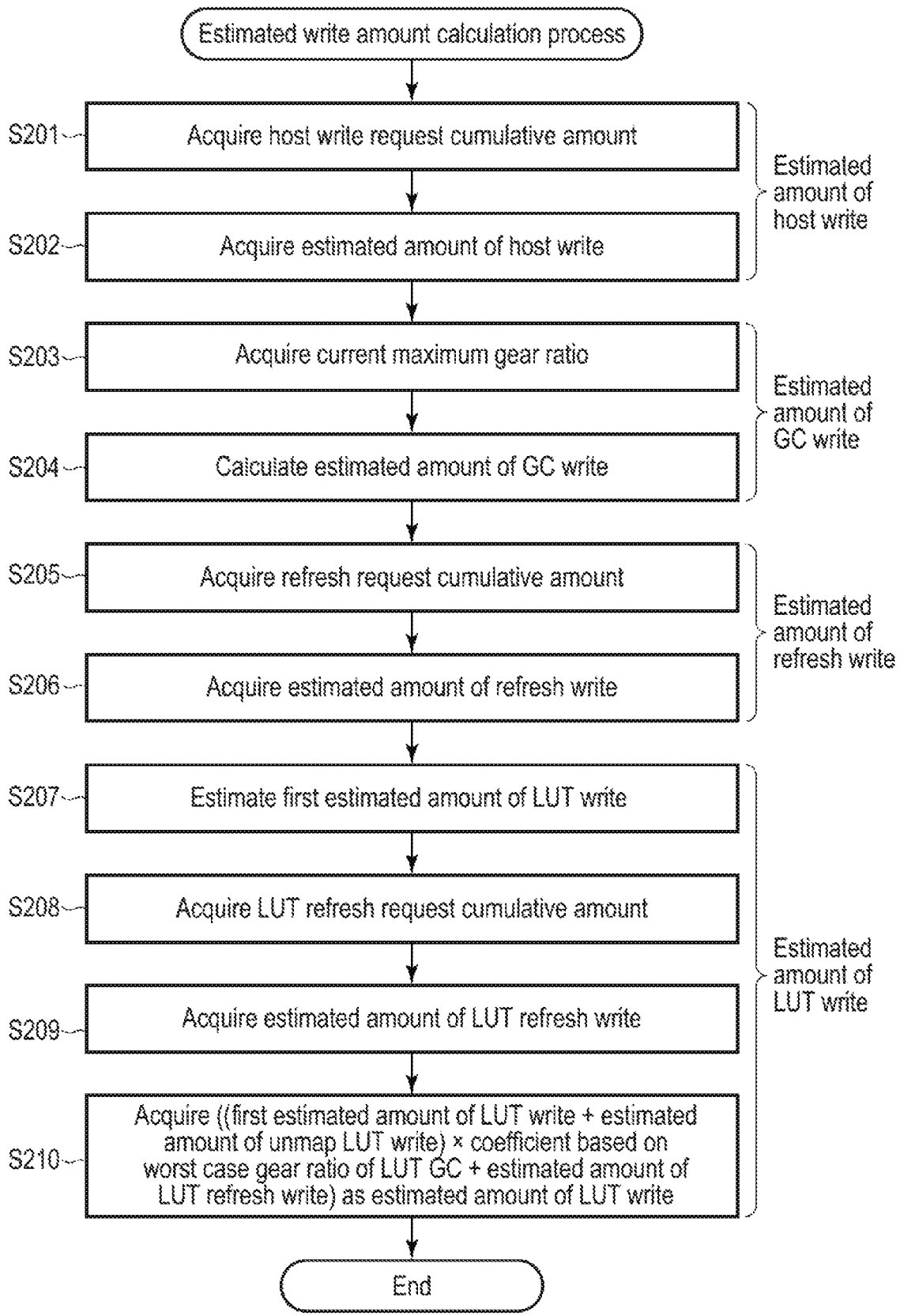
FIG. 6 is a flowchart illustrating an example of a procedure of an estimated write amount calculating process executed in the memory system of the embodiment.

FIG. 6 is a flowchart illustrating an example of the procedure of the estimated write amount calculation process executed by the write amount monitoring module 129. The estimated write amount calculation process corresponds to the write monitoring process described above with reference to S113 of FIG. 5.

The write amount monitoring module 129 acquires the cumulative amount of data that is required to be written in accordance with a write command (or write commands) by the host 2 (i.e., the host write request cumulative amount), from the host I/F 11 (S201). The write amount monitoring module 129 subtracts, from the acquired host write request cumulative amount, the host write request cumulative amount that was acquired for the previous determination of excessive write, in order to acquire the estimated amount of host write after the previous determination (S202). Incidentally, when first determining excessive write after booting up the control unit 12, the write amount monitoring module 129 uses the host write request cumulative amount acquired in the write monitoring process of S103 of FIG. 5 as the host write request cumulative amount that was acquired for the previous determination of excessive write.

The write amount monitoring module 129 acquires the current maximum gear ratio (i.e., the maximum execution ratio) from the GC control module 123 (S203). The maximum gear ratio is a gear ratio at which the ratio of the GC write operations to the host write operations is maximum except for the gear ratio used in the urgent state as described above. The write amount monitoring module 129 multiplies the estimated amount of host write by the maximum gear ratio in order to calculate the estimated amount of GC write after the previous determination of excessive write (S204).

The write amount monitoring module 129 acquires the cumulative amount of data on which the first refresh process is to be performed (i.e., the refresh request cumulative amount), from the refresh control module 124 (S205). The write amount monitoring module 129 subtracts, from the acquired refresh request cumulative amount, the refresh request cumulative amount that was acquired for the previous determination of excessive write, in order to acquire the estimated amount of refresh write after the previous determination (S206). Incidentally, when first determining excessive write after booting up the control unit 12, the write amount monitoring module 129 uses the refresh request cumulative amount acquired in the write monitoring process of S104 of FIG. 5 as the refresh request cumulative amount that was acquired for the previous determination of excessive write.

The write amount monitoring module 129 estimates the write amount of data of the LUT 22 (hereinafter referred to as the first LUT write estimated amount), which corresponds to a sum of the actual host write amount, the actual GC write amount, and the actual refresh write amount (S207). That is, the write amount monitoring module 129 estimates the data amount of the LUT 22 that is to be written in accordance with the actual host write amount, the actual GC write amount, and the actual refresh write amount. In addition, the write amount monitoring module 129 acquires the cumulative amount of data of the LUT 22 on which the second refresh process is to be performed (i.e., the LUT refresh request cumulative amount), from the LUT refresh control module 127 (S203). The write amount monitoring module 129 subtracts, from the acquired LUT refresh request cumulative amount, the LUT refresh request cumulative amount that was acquired for the previous determination of excessive write, in order to acquire the estimated amount of LUT refresh write after the previous determination (S209). Incidentally, when first determining excessive write after booting up the control unit 12, the write amount monitoring module 129 uses the LUT refresh request cumulative amount acquired in the write monitoring process of S105 of FIG. 5 as the LUT refresh request cumulative amount that was acquired for the previous determination of excessive write.

Then, the write amount monitoring module 129 calculates the value obtained by multiplying the sum of the first LUT write estimated amount, which is estimated in S207, and the estimated amount of LUT write operations performed by the unmap processing module 128 (hereinafter referred to as an unmap LUT write estimated amount) by a coefficient based on the gear ratio of the worst case of the second GC process for the LUT 22 (hereafter referred to as a GC coefficient), and then adds the estimated amount of LUT refresh write acquired in S208 to this value, in order to acquire the estimated amount of LUT write after the previous determination of excessive write (S209).

The write amount monitoring module 129 can calculate the estimated amount of host write, the estimated amount of GC write, the estimated amount of refresh write, and the estimated amount of LUT write, by executing the estimated write amount calculation process of FIG. 6. Incidentally, an example of calculating the estimated amount of host write, the estimated amount of GC write, the estimated amount of refresh write, and the estimated amount of LUT write, in this order, has been described with the estimated write amount calculation process of FIG. 6, but this order can be changed arbitrarily. In addition, these estimated amounts may be calculated in parallel.

Figure 7:
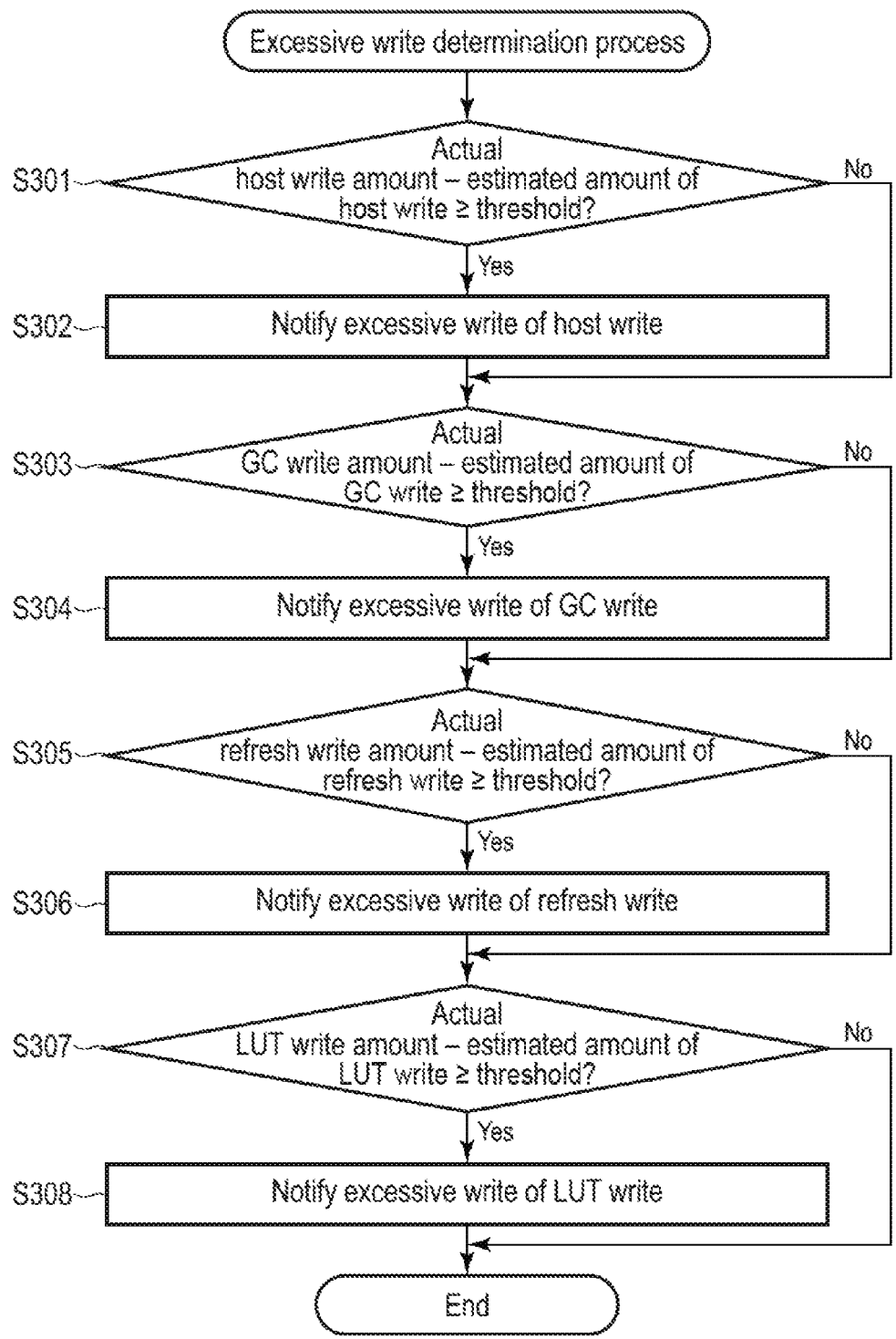
FIG. 7 is a flowchart illustrating an example of a procedure of an excessive write determination process executed in the memory system of the embodiment.

FIG. 7 is a flowchart illustrating an example of a procedure of the excessive write determination process executed by the write amount monitoring module 129. The excessive write determination process corresponds to the write monitoring process described above with reference to S114 of FIG. 5.

The write amount monitoring module 129 determines whether a value obtained by subtracting the estimated value of host write from the actual host write amount is larger than or equal to a threshold value or not (S301). When the value obtained by subtracting the estimated amount of host write from the actual host write amount is larger than or equal to the threshold value (YES in S301), the write amount monitoring module 129 notifies the reconfiguration control unit 111 of the excessive write of host write (S302), and proceeds to S303. On the other hand, when the value obtained by subtracting the estimated amount of host write from the actual host write amount is smaller than the threshold value (NO in S301), the write amount monitoring module 129 proceeds to S303 without executing the process of S302.

The write amount monitoring module 129 determines whether a value obtained by subtracting the estimated amount of GC write from the actual GC write amount is larger than or equal to a threshold value or not (S303). When the value obtained by subtracting the estimated amount of GC write from the actual GC write amount is larger than or equal to the threshold value (YES in S303), the write amount monitoring module 129 notifies the reconfiguration control unit 111 of the excessive write of GC write (S304), and proceeds to S305. On the other hand, when the value obtained by subtracting the estimated amount of GC write from the actual GC write amount is smaller than the threshold value (NO in S303), the write amount monitoring module 129 proceeds to S305 without executing the process of S304.

The write amount monitoring module 129 determines whether a value obtained by subtracting the estimated value of refresh write from the actual refresh write amount is larger than or equal to a threshold value or not (S305). When the value obtained by subtracting the estimated amount of refresh write from the actual refresh write amount is larger than or equal to the threshold value (YES in S305), the write amount monitoring module 129 notifies the reconfiguration control unit 111 of the excessive write of refresh write (S306), and proceeds to S307. On the other hand, when the value obtained by subtracting the estimated amount of refresh write from the actual refresh write amount is smaller than the threshold value (NO in S305), the write amount monitoring module 129 proceeds to S307 without executing the process of S306.

The write amount monitoring module 129 determines whether a value obtained by subtracting the estimated amount of LUT write from the actual LUT write amount is larger than or equal to a threshold value or not (S307). When the value obtained by subtracting the estimated amount of LUT write from the actual LUT write amount is larger than or equal to the threshold value (YES in S307), the write amount monitoring module 129 notifies the reconfiguration control unit 111 of the excessive write of LUT write (S308), and ends the excessive write determination process. On the ether hand, when the value obtained by subtracting the estimated amount of LUT write from the actual LUT write amount is smaller than the threshold value (NO in S307), the write amount monitoring module 129 ends the excessive write determination process without executing the process of S308.

With the excessive write determination process of FIG. 7, when the excessive write occurs in each of host write, GC write, refresh write, and LUT write, the write amount monitoring module 129 can notify the reconfiguration control unit 111 of the occurrence. Incidentally, the order of determining the excessive write of host write, GC write, refresh write, and LUT write can be freely changed. In addition, the threshold values used in these determinations may be the same values or different values.

Furthermore, alter all the determinations are finished, the write amount monitoring module 129 may notify the reconfiguration control unit 111 of all the determination results. The write amount monitoring module 129 may notify the reconfiguration control unit 111 that the NAND memory 5 is in the excessive write state when, for example, at least any one of the value obtained by subtracting the estimated amount of host write from the actual host write amount, the value obtained by subtracting the estimated amount of GC write from the actual GC write amount, the value obtained by subtracting the estimated amount of refresh write from the actual refresh write amount, and the value obtained by subtracting the estimated amount of LUT write from the actual LUT write amount is larger than or equal to a threshold value.

FIG. 8 is a flowchart illustrating an example of a procedure of a reconfiguration process executed by the reconfiguration control unit 111 and the control unit 12. In the excessive write determination process of the write amount monitoring module 129 described with reference to FIG. 7, the reconfiguration control unit 111 and the control unit 12 execute the reconfiguration process.

The reconfiguration control unit 111 determines whether the reconfiguration control unit 111 has been notified of excessive write in host write operations by the write amount monitoring module 129 or not (S401). When the reconfiguration control unit 111 has been notified of excessive write in host write operations (YES in S401), the reconfiguration control unit 111 determines whether an unnecessary flush process occurs in the host write operations with the excessive write (S402). When the unnecessary flush process occurs (YES in S402), the reconfiguration control unit 111 stops the unnecessary flush process (S403) and ends the reconfiguration process. More specifically, when the reconfiguration control unit 111 has been notified of the excessive write state in host write operations (YES in S401) and when the unnecessary flush process occurs in the host write operations (YES in S402), the reconfiguration control unit 111 causes the write/read control module 122 to stop the unnecessary flush process.

When the reconfiguration control unit 111 has not beer, notified of excessive write in host write operations (NO in S401), the reconfiguration control unit 111 determines whether the reconfiguration control unit 111 is notified of excessive write in GC write operations by the write amount monitoring module 129 or not (S404). When the reconfiguration control unit 111 is notified of excessive write of GC write operations (YES in S404), the reconfiguration control unit 111 causes the GG control module 123 to change the parameters of GC write operations (S405). Then, the process proceeds to S402. The parameters of GC write operations include, for example, a gear ratio of host write operations to GC write operations. The GC control module 123 may determine whether the gear ratio is appropriate or not, in accordance with a request of the reconfiguration control unit 111 for changing the parameters, and may change the gear ratio when the gear ratio is inappropriate.

Note that since the gear ratio indicates an execution ratio of GC write operations to host write operations as described above, the gear ratio is also a parameter of host write operations. When notified of excessive write of host write operations, the GC control unit 123 may change the gear ratio in cooperation with the write/read control module 122.

Next, the reconfiguration control unit 111 determines whether an unnecessary flush process occurs in the GC write operations with the excessive write (S402). When the unnecessary flush process occurs (YES in S402), the reconfiguration control unit 111 stops the unnecessary flush process (S403) and ends the reconfiguration process. More specifically, when the reconfiguration control unit 111 is notified of excessive write in GC write operations (YES in S404) and when the unnecessary flush process occurs in the GC write operations (YES in S102), the reconfiguration control unit 111 causes the GC control module 123 to stop the unnecessary flush process.

When the reconfiguration control unit 111 is not notified of excessive write in GC write operations (NO in S404), the reconfiguration control unit 111 determines whether the reconfiguration control unit 111 is notified of excessive write in refresh write operations by the write amount monitoring module 129 or not (S406). When the reconfiguration control unit 111 is notified of excessive write in refresh write operations (YES in S406), the reconfiguration control unit 111 causes the refresh control module 124 to change parameters of the refresh write operations (S407). Then, the process proceeds to S402. The parameters of the refresh write operations include, for example, the cycle of a refresh write operation, the selection conditions of a refresh source block, and the refresh target block information. More specifically, the refresh control module 124 determines whether the refresh write cycle is appropriate or not in accordance with a request of the reconfiguration control unit 111 for changing the parameters, and changes the cycle when the cycle is inappropriate. In addition, the refresh control module 124 changes the selection conditions of a refresh source block and updates the refresh target block information, in accordance with a request of the reconfiguration control unit 111 for changing the parameters.

Then, the reconfiguration control unit 111 determines whether an unnecessary flush process occurs in the refresh write operations with the excessive write (S402). When the unnecessary flush process occurs (YES in S402), the reconfiguration control unit 111 stops the unnecessary flush process (S403) and ends the reconfiguration process. More specifically, when the reconfiguration control unit 111 is notified of an excessive write state in refresh write operations (YES in S406) and when the unnecessary flush process occurs in the refresh write operations (YES in S402), the reconfiguration control unit 111 causes the refresh control module 124 to stop the unnecessary flush process.

When the reconfiguration control unit 111 is not notified of excessive write in refresh write operations (NO in S406), the reconfiguration control unit 111 determines whether the reconfiguration control unit 111 is notified of excessive write in LUT write operations by the write amount monitoring module 129 or net (S408). When the reconfiguration control unit 111 is notified of excessive write in LUT write operations (YES in S408), the reconfiguration control unit 111 causes at least any one of the LUT write control module 125, the LUT GC control module 126, the LUT refresh control module 127, and the unmap processing module 128 to change parameters of the LUT write operations (S409). Then, the process proceeds to S402. The parameters of the LUT write operations include, for example, (1) a gear ratio of LUT GC write operations to LUT write operations, which occur in accordance with host write operations, GC write operations, refresh write operations, and unmap operations, (2) a cycle of a refresh write operation of the LUT 22, (3) selection conditions of a refresh source block of the LUT 22, and (4) refresh target, block information of the LUT 22. More specifically, the LUT GC control module 126 may determine whether the gear ratio of the LUT 22 is appropriate or not in accordance with a request of the reconfiguration control unit 111 for changing the parameters, and may change the gear ratio when the gear ratio is inappropriate. The LUT refresh control module 127 determines whether the LUT refresh write cycle is appropriate or not, and changes the cycle when the cycle is inappropriate. In addition, the LUT refresh control module 127 changes the selection conditions of a refresh source block of LUT and updates the refresh target block information of LUT, in accordance with a request of the reconfiguration control unit 111 for changing the parameters.

Then, the reconfiguration control unit 111 determines whether an unnecessary flush process occurs in the LUT write operations with the excessive write state (S402). When the unnecessary flush process occurs (YES in S402), the reconfiguration control unit 111 stops the unnecessary flush process (S403) and ends the reconfiguration process. More specifically, when the reconfiguration control unit 111 is notified of an excessive write state in LUT write operations (YES in S408) and when the unnecessary flush process occurs in the LUT write operations (YES in S402), the reconfiguration control unit 111 causes at least any one of the LUT write control module 125, the LUT GC control module 126, the LUT refresh control module 127, and the unmap processing module 128 to stop the unnecessary flush process.

When the reconfiguration control unit 111 is not notified of an excessive write state in LUT write operations (NO in S408), the reconfiguration control unit 111 ends the reconfiguration process.

With the reconfiguration process of FIG. 8, the reconfiguration control unit 111 and the control unit 12 can change the parameters of write operations in accordance with the type of the write operations for which the notification of the excessive write state is received. In addition, when an unnecessary flush process occurs in the write operations with the excessive write state, the reconfiguration control unit 111 and the control unit 12 can stop the unnecessary flush process.

FIG. 9 is a flowchart illustrating another example of a procedure of the reconfiguration process executed by the reconfiguration control unit 111 and the control unit 12. In the excessive write determination process of the write amount monitoring module 129 in FIG. 7, the reconfiguration control unit 111 may execute this reconfiguration process.

The reconfiguration control unit 111 determines whether the reconfiguration control unit 111 is notified that the NAND memory 5 is in an excessive write state by the write amount monitoring module 129 or not (S601). When the reconfiguration control unit 111 is not notified that the NAND memory 5 is in an excessive write state (NO in S601), the reconfiguration control unit 111 ends the reconfiguration process.

When the reconfiguration control unit 111 is notified that the NAND memory 5 is in an excessive write state (YES in S601), the reconfiguration control unit 111 reboots the control unit 12 (S602). Then, the rebooted control unit 12 changes parameters of actual write operations, which are used in each module in the control unit 12 (S603). The parameters include, for example, (1) a gear ratio of host write operations to GC write operations, (2) a cycle of a refresh write operation, (3) selection conditions of a refresh source block, (4) refresh target block information, (5) a gear ratio of LUT GC write operations to LUT write operations that occur in accordance with host write operations, GC write operations, refresh write operations, and LUT write operations, and unmap operations, (6) a cycle of a refresh write operation of LUT, (7) selection conditions of a refresh source block of LUT, and (8) LUT refresh target block information. The concrete operations of changing each of the parameters is the same as that of the reconfiguration process described above with reference to the flowchart of FIG. 8.

In addition, the reconfiguration control unit 111 determines whether an unnecessary flush process occurs or not (S604). When the unnecessary flush process occurs (YES in S604), the reconfiguration control unit 111 stops the unnecessary flush process (S605) and ends the reconfiguration process. More specifically, the reconfiguration control unit 111 determines whether an unnecessary flush process occurs in each of host write operations, GC write operations, refresh write operations, and LUT write operations. When an unnecessary flush process occurs in host write operations, the reconfiguration control, unit 111 causes the write/read control module 122 to stop the unnecessary flush process. When an unnecessary flush process occurs in GC write operations, the reconfiguration control unit 111 causes the GC control module 123 to stop the unnecessary flush process. When an unnecessary flush process occurs in refresh write operations, the reconfiguration control unit 111 causes the refresh control module 124 to stop the unnecessary flush process. In addition, when an unnecessary flush process occurs in LUT write operations, the reconfiguration control unit 111 causes at least any one of the LUT write control module 125, the LUT GC control module 126, the LUT refresh control, module 127, and the unmap processing module 128 to stop the unnecessary flush process.

When an unnecessary flush process does not occur (NO in S604), the reconfiguration control unit 111 ends the reconfiguration process.

With the reconfiguration process of FIG. 9, the reconfiguration control unit 111 can change the parameters of write operations by rebooting the control unit 12 in accordance with the notice of the excessive write state. In addition, when an unnecessary flush process occurs, the control unit 12 rebooted by the reconfiguration control unit 111 can stop the unnecessary flush process.

As described above, according to the present embodiment, the lifetime of the nonvolatile memory can be extended. The write amount monitoring module 129 acquires the write amount to the NAND memory 5 in the first period. The write amount monitoring module 129 calculates the estimated write amount to the NAND memory 5 in the first period. Then, when the write amount is larger than the estimated amount by the first threshold value or more, the reconfiguration control unit 111 changes one or more parameters used for writing data to the NAND memory 5. Thus, since excessive write to the NAND memory 5 can be suppressed, unnecessary wear can be suppressed and the lifetime of the NAND memory 5 can be extended.

Each of various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiments may be realized in a processing circuit.

While certain embodiments have been described, these embodiments have been presented by way of example only, and are not intended to limit the scope of the inventions. Indeed, the novel embodiments described herein may be embodied in a variety of other forms; furthermore, various emissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
 a nonvolatile memory including blocks; and
 a controller circuit configured to control the nonvolatile memory,
 wherein the controller circuit is further configured to:
  acquire a first write amount of first data that is actually written into the nonvolatile memory in a first period,
  calculate a second write amount of second data that is estimated to be written into the nonvolatile memory in the first period with respect to the first data,
  change, when the first write amount is larger than the second write amount by a first threshold value or more, one or more parameters used for writing of data to the nonvolatile memory,
  acquire a first data amount which is actually written into the nonvolatile memory in the first period in accordance with one or more write requests of a host device,
  acquire a third data amount which is actually written into the nonvolatile memory in the first period by performing a first garbage collection process on blocks storing user data,
  calculate a maximum execution ratio of write operations by the first garbage collection process to write operations in accordance with the one or more write requests of the host device, by using a writable amount of data remaining in the nonvolatile memory and a overprovisioning ratio of the nonvolatile memory,
  calculate a fourth data amount which is estimated to be written into the nonvolatile memory in the first period by performing the first garbage collection process, by using the first data amount and the maximum execution ratio, and
  change the one or more parameters when the third data amount is larger than the fourth data amount by the first threshold value or more.

2. The memory system according to claim 1, wherein the controller circuit is further configured to change, when the first write amount is larger than the second write amount by the first threshold value or more, the one or more parameters in accordance with rebooting at least a part of the controller circuit.

3. The memory system according to claim 1, wherein the controller circuit is further configured to stop a write process performed on the nonvolatile memory when the first write amount is larger than the second write amount by the first threshold value or more.

4. The memory system according to claim 3, wherein the controller circuit is further configured to stop, when the first write amount is larger than the second write amount by the first threshold value or more, the write process performed on the nonvolatile memory in accordance with rebooting at least a part of the controller circuit.

5. The memory system according to claim 1, wherein the controller circuit is further configured to:
 acquire a first data amount which is actually written into the nonvolatile memory in the first period in accordance with one or more write requests of a host device,
 calculate a second data amount which is estimated to be written into the nonvolatile memory in the first period in accordance with the one or more write requests of the host device, and
 change the one or more parameters when the first data amount is larger than the second data amount by the first threshold value or more.

6. The memory system according to claim 1, wherein the controller circuit is configured to:
 acquire a fifth data amount which is actually written into the nonvolatile memory in the first period by performing a first refresh process on blocks storing user data,
 calculate a sixth data amount on which the first refresh process is newly needed to be performed in the first period, and change the one or more parameters when the fifth data amount is larger than the sixth data amount by the first threshold value or more.

7. The memory system according to claim 1, wherein the controller circuit is further configured to change the one or more parameters when the first write amount is larger than a maximum rewritable amount of the nonvolatile memory tolerable in the first period by a second threshold value or more, the second threshold value being different from the first threshold value.

8. A memory system comprising:
a nonvolatile memory including blocks; and
a controller circuit configured to control the nonvolatile memory,
wherein the controller circuit is further configured to:
acquire a first write amount of first data that is actually written into the nonvolatile memory in a first period,
calculate a second write amount of second data that is estimated to be written into the nonvolatile memory in the first period with respect to the first data,
change, when the first write amount is larger than the second write amount by a first threshold value or more, one or more parameters used for writing of data to the nonvolatile memory,
acquire a first data amount which is actually written into the nonvolatile memory in the first period in accordance with one or more write requests of the host device,
acquire a third data amount which is actually written into the nonvolatile memory in the first period by performing a first garbage collection process on blocks storing user data,
acquire a fifth data amount which is actually written into the nonvolatile memory in the first period by performing a first refresh process on blocks storing user data,
calculate a seventh data amount of system management data which is estimated to be written into the nonvolatile memory in the first period, by using the first data amount, the third data amount, and the fifth data amount,
calculate an execution ratio of write operations by a second garbage collection process on blocks storing the system management data to write operations of the system management data in accordance with the one or more write requests of the host device, the first garbage collection process, and the first refresh process, by using a write amount of the system management data,
calculate an eighth data amount on which a second refresh process on blocks storing the system management data is newly needed to be performed in the first period,
calculate a ninth data amount of the system management data which is estimated to be written into the nonvolatile memory in the first period, by using the seventh data amount, the execution ratio, and the eighth data amount, and
change the one or more parameters when a tenth data amount of the system management data written into the nonvolatile memory in the first period is larger than the ninth data amount by the first threshold value or more.

9. The memory system according to claim 8, wherein the tenth data amount includes an eleventh data amount of the system management data which is actually written into the nonvolatile memory in the first period in accordance with one or more requests of the host device to delete user data stored in the nonvolatile memory, and
the controller circuit is further configured to calculate the ninth data amount estimated to be written into the nonvolatile memory in the first period, by using the seventh data amount, the execution ratio, the eighth data amount, and the eleventh data amount.

10. The memory system according to claim 8, wherein the controller circuit is further configured to, when the first write amount is larger than the second write amount by the first threshold value or more, change the one or more parameters in accordance with rebooting at least a part of the controller circuit, or stop a write process performed on the nonvolatile memory.

11. The memory system according to claim 8, wherein the controller circuit is further configured to:
acquire a first data amount which is actually written into the nonvolatile memory in the first period in accordance with one or more write requests of a host device,
calculate a second data amount which is estimated to be written into the nonvolatile memory in the first period in accordance with the one or more write requests of the host device, and
change the one or more parameters when the first data amount is larger than the second data amount by the first threshold value or more.

12. A control method of a memory system comprising a nonvolatile memory including blocks, the method comprising:
acquiring a first write amount of first data that is actually written into the nonvolatile memory in a first period;
calculating a second write amount of second data that is estimated to be written into the nonvolatile memory in the first period with respect to the first data;
changing, when the first write amount is larger than the second write amount by a first threshold value or more, one or more parameters used for writing of data to the nonvolatile memory;
acquiring a first data amount which is actually written into the nonvolatile memory in the first period in accordance with one or more write requests of a host device;
acquiring a third data amount which is actually written into the nonvolatile memory in the first period by performing a first garbage collection process on blocks storing user data;
calculating a maximum execution ratio of write operations by the first garbage collection process to write operations in accordance with the one or more write requests of the host device, by using a writable amount of data remaining in the nonvolatile memory and a overprovisioning ratio of the nonvolatile memory;
calculating a fourth data amount which is estimated to be written into the nonvolatile memory in the first period by performing the first garbage collection process, by using the first data amount and the maximum execution ratio; and
changing the one or more parameters when the third data amount is larger than the fourth data amount by the first threshold value or more.

13. The control method according to claim 12, further comprising
changing, when the first write amount is larger than the second write amount by the first threshold value or more, the one or more parameters in accordance with rebooting at least a part of a controller circuit in the memory system.

14. The control method according to claim 12, further comprising
stopping a write process performed on the nonvolatile memory when the first write amount is larger than the second write amount by the first threshold value or more.

15. The control method according to claim 14, further comprising
stopping, when the first write amount is larger than the second write amount by the first threshold value or more, the write process performed on the nonvolatile memory in accordance with rebooting at least a part of a controller circuit in the memory system.

16. The control method according to claim 12, further comprising:
acquiring a first data amount which is actually written into the nonvolatile memory in the first period in accordance with one or more write requests of a host device;
calculating a second data amount which is estimated to be written into the nonvolatile memory in the first period in accordance with the one or more write requests of the host device; and
changing the one or more parameters when the first data amount is larger than the second data amount by the first threshold value or more.

17. The control method according to claim 12, further comprising:
acquiring a fifth data amount which is actually written into the nonvolatile memory in the first period by performing a first refresh process on blocks storing user data;
calculating a sixth data amount on which the first refresh process is newly needed to be performed in the first period; and
changing the one or more parameters when the fifth data amount is larger than the sixth data amount by the first threshold value or more.

18. The control method according to claim 12, further comprising:
acquiring a fifth data amount which is actually written into the nonvolatile memory in the first period by performing a first refresh process on blocks storing user data;
calculating a seventh data amount of system management data which is estimated to be written into the nonvolatile memory in the first period, by using the first data amount, the third data amount, and the fifth data amount;
calculating an execution ratio of write operations by a second garbage collection process on blocks storing the system management data to write operations of the system management data in accordance with the one or more write requests of the host device, the first garbage collection process, and the first refresh process, by using a write amount of the system management data;
calculating an eighth data amount on which a second refresh process on blocks storing the system management data is newly needed to be performed in the first period;
calculating a ninth data amount of the system management data which is estimated to be written into the nonvolatile memory in the first period, by using the seventh data amount, the execution ratio, and the eighth data amount; and
changing the one or more parameters when a tenth data amount of the system management data written into the nonvolatile memory in the first period is larger than the ninth data amount by the first threshold value or more.

19. The control method according to claim 18, wherein
the tenth data amount includes an eleventh data amount of the system management data which is actually written into the nonvolatile memory in the first period in accordance with one or more requests of the host device to delete user data stored in the nonvolatile memory, and
the control method further comprises calculating the ninth data amount, which is estimated to be written into the nonvolatile memory in the first period, by using the seventh data amount, the execution ratio, the eighth data amount, and the eleventh data amount.

20. The control method according to claim 12, further comprising
changing the one or more parameters when the first write amount is larger than a maximum rewritable amount of the nonvolatile memory tolerable in the first period by a second threshold value or more, the second threshold value being different from the first threshold value.

* * * * *